(12) United States Patent
Robinson

(10) Patent No.: US 10,746,899 B2
(45) Date of Patent: *Aug. 18, 2020

(54) 3D-WELL LOG INVENTION

(71) Applicant: Mark C. Robinson, Austin, TX (US)

(72) Inventor: Mark C. Robinson, Austin, TX (US)

( * ) Notice: Subject to any disclaimer, the term of this patent is extended or adjusted under 35 U.S.C. 154(b) by 1204 days.

This patent is subject to a terminal disclaimer.

(21) Appl. No.: 14/574,165

(22) Filed: Dec. 17, 2014

(65) Prior Publication Data

US 2015/0106018 A1 Apr. 16, 2015

Related U.S. Application Data

(63) Continuation-in-part of application No. 14/246,218, filed on Apr. 7, 2014, now abandoned, which is a continuation of application No. 12/911,272, filed on Oct. 25, 2010, now Pat. No. 8,694,261.

(60) Provisional application No. 61/313,211, filed on Mar. 12, 2010.

(51) Int. Cl.
*G01V 11/00* (2006.01)

(52) U.S. Cl.
CPC ........ *G01V 11/00* (2013.01); *G01V 2210/665* (2013.01)

(58) Field of Classification Search
CPC .................................. G01V 1/30; G01V 1/28
See application file for complete search history.

(56) References Cited

U.S. PATENT DOCUMENTS

| | | | |
|---|---|---|---|
| 5,012,675 A | 5/1991 | Koller et al. | |
| 6,446,006 B1 * | 9/2002 | Thore | G01V 1/282 702/16 |
| 7,054,753 B1 * | 5/2006 | Williams | G01V 1/32 702/13 |
| 7,502,771 B2 * | 3/2009 | Bouzas | G06F 8/10 700/30 |
| 7,706,981 B2 | 4/2010 | Wilkinson et al. | |
| 8,423,337 B2 | 4/2013 | Hsu et al. | |
| 8,694,261 B1 * | 4/2014 | Robinson | E21B 47/00 702/14 |
| 2002/0038201 A1 * | 3/2002 | Balaven | G06T 17/20 703/2 |
| 2004/0225443 A1 | 11/2004 | Kamps | |

(Continued)

OTHER PUBLICATIONS

Sada Version 5 User's Guide, Chapter 28—Basic Geospacial Methods, University of Tennessee 2008.

(Continued)

*Primary Examiner* — Manuel A Rivera Vargas
*Assistant Examiner* — Yaritza H Perez Bermudez
(74) *Attorney, Agent, or Firm* — Daniel N. Lundeen; Lundeen & Lundeen PLLC

(57) ABSTRACT

A process to create a well grid from an initial x, y grid spacing, by assigning x, y, z datapoints, from wells from a dataset of well data comprising attributes associated with the x, y, z datapoints, to closest x, y nodes in the grid, wherein the x, y, z datapoints from a plurality of the wells are iteratively spaced away from the closest x, y grid nodes until no more than one well is assigned to any single-well x, y grid node, and populating the respective single-well x, y grid nodes with the attributes associated with the assigned x, y, z datapoints to form a matrix of x, y, z grid nodes populated with the attributes to generate a 3D well log grid.

26 Claims, 15 Drawing Sheets

(56) References Cited

U.S. PATENT DOCUMENTS

| | | |
|---|---|---|
| 2006/0280031 A1 | 12/2006 | Chopra et al. |
| 2010/0094559 A1 | 4/2010 | Contreras et al. |
| 2010/0243328 A1* | 9/2010 | Rodriguez Herrera ... E21B 7/04 175/61 |
| 2011/0320182 A1* | 12/2011 | Dommisse ............... G01V 1/34 703/10 |
| 2015/0106018 A1* | 4/2015 | Robinson ............... G01V 11/00 702/11 |

OTHER PUBLICATIONS

Robinson, M.C. 2012—Stratal slicing the Permian "Wolfberry" trend of the Midland Basin, Texas with geophysical well-log data, (Presented orally to the West Texas Geological Society, Midland, TX, Sep. 27, 2012).

Wylie, A.S. and Huntoon, J.E. 2003—Log-curve amplitude slicing: Visualization of log data and depositional trends in the Middle Devonian Traverse Group, Michigan basin, United States, AAPG Bulletin, v. 87, No. 3, pp. 581-608.

Carr, Tim et al., 2-D and 3-D Pseudo-Seismic Transforms of Wireline Logs: A Seismic Approach to Petrophysical Sequence Stratigraphy, Mar. 12, 2010, http://www.kgs.ku.edu/PRS/publication/carrintro.html.

Denham, L.R. et al., Rock Property Data Volumes from Well Logs, Nov. 3, 2007, Search and Discovery Article #40268 (2007).

Robins et al. "Visualizing Cortical Waves and Timing from Data." 2008. pp. 401-408.

Pierce et al. Visualizing Geophysical Data: Teasing Meaning from Models. 1995. pp. 4-5.

Kirby Robert M. II. Visualizing Fluid Flow Data. May 2001.

Green et al. "Visualizing Legacy Stratigraphic Data from Archaelogical Handbooks." 2002.

* cited by examiner

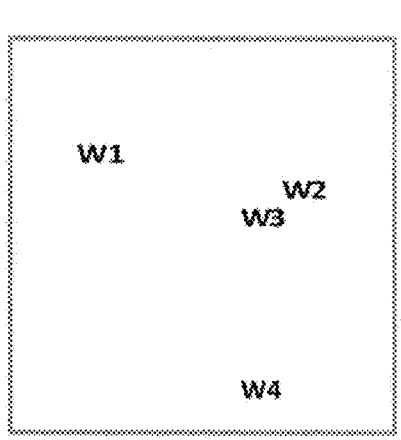
Figure 11. Initial locations of wells(W1-W4)
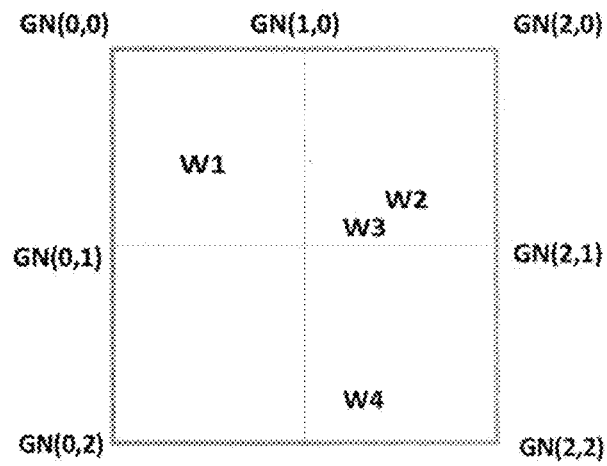
Figure 12. Initial Grid Creation (GN(0,0) – GN(2,2))
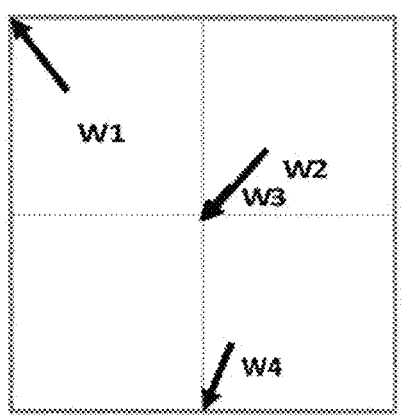
Figure 13. Well association with nodes:
W1-GN(0,0)
W2-GN(1,1)
W3-GN(1,1)
W4-GN(1,2)
W2 and W3 wells at same node, requires grid refinement.
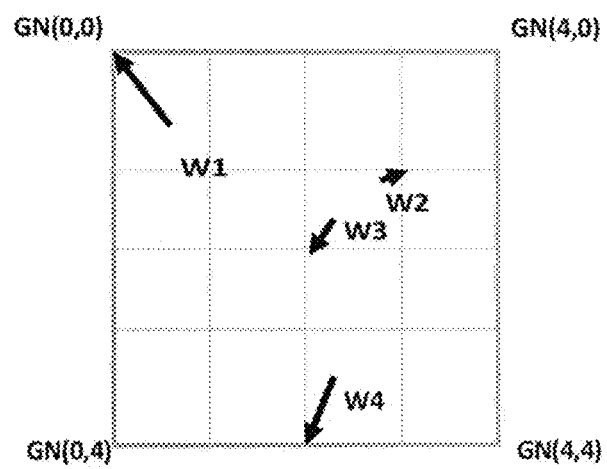
Figure 14. Well association with refined Grid nodes:
W1-GN(0,0)
W2-GN(3,1)
W3-GN(2,2)
W4-GN(2,4)
All wells assigned to unique nodes.

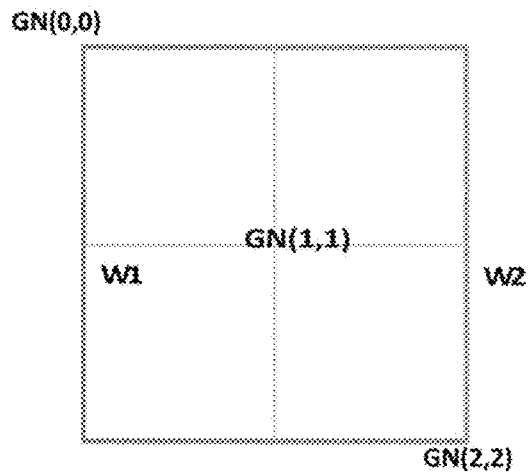
Figure 15. Plan view of wells W1 and W2 assigned to nodes.
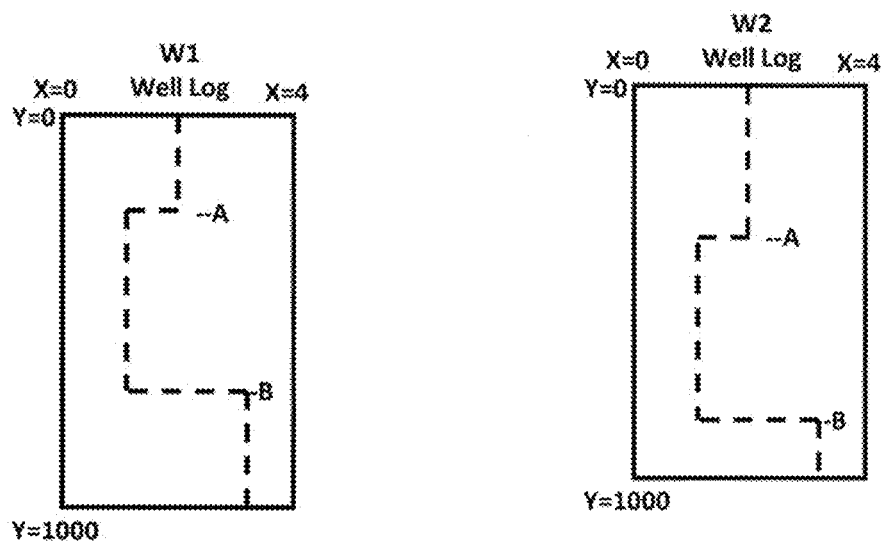
Figure 16. Generalized well log for Well W1 with stratigraphic correlations A and B.
Figure 17. Generalized well log for Well W2 with stratigraphic correlations A and B.

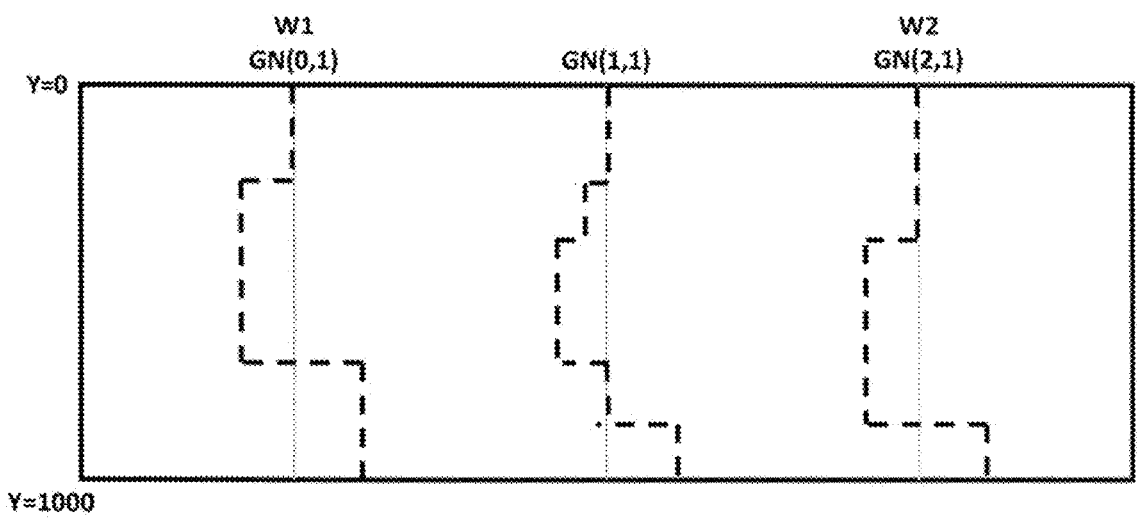
Figure 18. Generated well log for node GN(1,1) if stratigraphic correlations A and B not used.
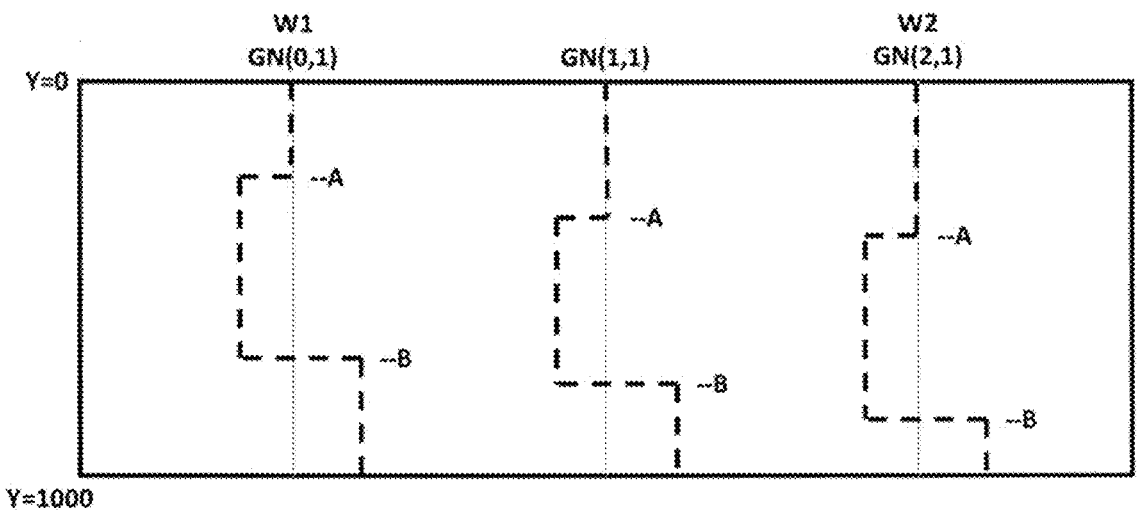
Figure 19. Generated well log for node GN(1,1) if stratigraphic correlations A and B are used.

3D-WELL LOG INVENTION

CROSS REFERENCE TO RELATED APPLICATIONS

This application is a continuation in part of U.S. Ser. No. 14/246,218, filed Apr. 7, 2014, which is a continuation of U.S. Ser. No. 12/911,272, filed Oct. 25, 2010, now U.S. Pat. No. 8,694,261, which is a non-provisional and claims the benefit of US 61/313,211, filed Mar. 22, 2010, each of which are incorporated fully by reference herein.

BACKGROUND

The term "pseudo-seismic" has been used to describe efforts to convert any non-seismic data type into the seismic data domain. Previous workers converted digital well-log data into SEG-Y format and loaded those data into seismic workstations. The results were less than acceptable because of the discontinuous nature of wellbore data and the fact that the method destroyed the connection between the actual wellbore location and the location of the trace to which it has been assigned. See Carr et al., 2-D and 3-D Pseudo-Seismic Transforms of Wireline Logs: A Seismic Approach to Petrophysical Sequence Stratigraphy, Open-File Reports, Kansas Geological Survey, University of Kansas (1995) (available at http://www.kgs.ku.edu/PRS/publication/carr.html); Escaloma et al., Sequence Stratigraphic analysis of Eocene clastic foreland deposits in central Lake Maracaibo using high-resolution well correlation and 3-D seismic data, AAPG Bulletin, V. 90, No. 4, pp. 581-623 (April 2006).

For example, previous workers also calibrated seismic attribute data with wellbore data to generate pseudo-well logs to predict the nature of rocks at a given location. The method used 3D-seismic attribute data as input to derive expected values of standard well log curves at a single location, which may be a wellbore or a hypothetical wellbore location. For example, see U.S. Pat. No. 7,706,981.

Denham and Nelson, Rock Property Data Volumes from Well Logs, Search and Discovery Article #40268 (2007), generated rock property data in 60 meter vertical sample intervals for wellbores and loaded these data into a regular grid. The values of the grid nodes were averaged based upon the proximity of the wellbores selected within a given radius of the wellbore. They concluded that the technique was suitable for regional analysis only.

U.S. Pat. No. 7,054,753 discloses a method of locating oil and gas exploration prospects by data visualization and organization by digitizing well log data, marking common geologic time markers and visually displaying the data in various viewing formats. All references mentioned herein are hereby incorporated herein by reference in their entireties for all purposes.

SUMMARY OF THE INVENTION

The present invention relates in one aspect to the creation of a continuous three dimensional array of data derived from digital information obtained from various depths within a wellbore, and the representation of these data in a formatted dataset that can be manipulated in standard 3D-seismic interpretation and visualization software. The invention also relates in another aspect to providing the capability to export stratigraphic interpretations made while working within the 3D-log data volume back to any well that is encompassed within the areal extent of the 3D-log data volume.

In one embodiment, a 2D well grid creation process comprises the steps of (a) selecting an initial grid spacing, (b) assigning wells from a dataset of well data to closest nodes in the grid, (c) if a plurality of wells are assigned to a single node after completing step (b), narrowing the grid spacing and repeating step (b) until no more than one well is assigned to any node.

In another embodiment, a 3D well log grid creation process comprises the step of associating tabulated well log data with a matrix of grid nodes with single wells assigned to single nodes. In a further embodiment, the tabulated well log data can comprise stratigraphic correlations by well, whereby the 3D well log grid comprises a matrix of grid nodes with stratigraphic correlations assigned to the single-well nodes. Further still, in an embodiment the process can include populating non-well nodes with stratigraphic correlation data.

In an embodiment, the 3D well log grid creation process can include populating non-well nodes with well log data extrapolated from single-well nodes. Further, in one embodiment stratigraphic tops are used to control the non-well node population. In one embodiment, the all-node-populated 3D matrix of well log data is converted to a seismic data format such as, for example, SEG-Y, SEG P1, as defined by the Society of Exploration Geophysics (SEG), and so on. The 3D well log dataset can be interpreted using standard seismic industry software, e.g., petrophysical, log facies, structural and other interpretations; further the interpretations can be associated with a well process at a specific well through the use of unique well identifiers, e.g., completion and production of oil and gas wells, the creation of pseudo wells to evaluate exploration opportunities, and the like.

The present invention also relates to a process to create a well log grid, in particular a continuous three dimensional array of data derived from digital information obtained from various depths within a well, the representation of these data formatted in a dataset that can be manipulated in standard 3D-seismic interpretation and/or other visualization software. In embodiments, the invention relates to a process of providing the capability to export stratigraphic interpretations made while working within the 3D-log data volume back to any well that is encompassed within the areal extent of a particular 3D-log data volume.

In embodiments, a process to create a well grid comprises the steps of:
a) selecting an initial x, y grid spacing;
b) assigning x, y, z datapoints from wells from a dataset of well data comprising attributes associated with the x, y, z datapoints, to closest x, y nodes in the grid, wherein the x, y, z datapoints from a plurality of the wells are spaced away from the closest x, y grid nodes;
c) if x, y, z datapoints from a plurality of wells are assigned to a single x, y grid node after completing step b, narrowing the x, y grid spacing and repeating step b until the x, y, z datapoints from no more than one well are assigned to any one single-well x, y grid node; and
d) populating the respective single-well x, y grid nodes with the attributes associated with the assigned x, y, z datapoints to form a matrix of x, y, z grid nodes populated with the attributes to generate a 3D well log grid.

In embodiments, a process comprises associating tabulated well data comprising well log data from at least one well, e.g., a well comprising a non-vertical wellbore, associated with unique well identifiers and stratigraphic correlations by well with a matrix of x, y grid nodes wherein x, y, z datapoints from no more than one well are assigned to single x, y grid nodes to generate a 3D grid matrix of well log data, wherein the matrix comprises a uniform spacing between the x, y grid nodes with respect to an X-axis and a uniform spacing between the x, y grid nodes with respect to a Y-axis, wherein the spacing with respect to the X- and Y-axes may be the same or different; and generating the uniform grid spacings with respect to the X- and Y-axes by a generation process comprising the steps of:

a) selecting an initial 2D grid spacing;
b) assigning x, y, z datapoints from the tabulated well data to closest x, y grid nodes; and
c) if x, y, z datapoints from a plurality of wells are assigned to a single x, y grid node after completing step b, narrowing the grid spacing and repeating step b until x, y, z datapoints from no more than one well are assigned to any x, y grid node.

In embodiments, a process comprises the steps of:

a) selecting an initial 3D grid spacing comprising x, y, z nodes having a uniform grid spacing with respect to an X-axis and with respect to a Y-axis, wherein the grid spacing with respect to the X- and Y-axes may be the same or different;
b) assigning x, y, z datapoints from wellbores from a dataset of well data to closest x, y, z nodes in the grid, e.g., wherein the wells comprise one or more non-vertical wellbores;
c) if x, y, z datapoints from a plurality of wells are assigned to a single x, y, z node after completing step b, narrowing the grid spacing and repeating step b until x, y, z datapoints from no more than one well are assigned to any one x, y, z node, wherein a plurality of the assigned x, y, z datapoints are spaced away from the respective closest x, y, z nodes;
d) populating the closest x, y, z nodes with the well data from the assigned x, y, z data points;
e) if any x, y, z nodes remain unpopulated after step d, populating the remaining x, y, z nodes with well data extrapolated from the populated closest x, y, z nodes to generate an all-node-populated 3D matrix of well data; and
f) converting the all-node-populated 3D matrix of well data to a seismic data format.

BRIEF DESCRIPTION OF THE DRAWINGS

FIG. 11 is a plan diagram of the location of hypothetical wells W1, W2, W3 and W4 associated with well log data according to an embodiment of the invention as described in the examples below.

FIG. 12 is a plan diagram of the wells of FIG. 11 with an initial grid system applied according to an embodiment of the invention as described in the examples below.

FIG. 13 is a plan diagram of the wells and grid of FIG. 12 showing association of the wells to the nearest grid node according to an embodiment of the invention as described in the examples below, wherein more than one well is associated with a grid node.

FIG. 14 is a plan diagram of the wells of FIGS. 11 to 13 following reduction (halving) of the grid spacing from FIG. 12 showing association of the wells to the nearest grid node according to an embodiment of the invention as described in the examples below, wherein no more than one well is associated with any grid node.

FIG. 15 is a plan diagram of hypothetical wells W1, W2 showing assignment to grid nodes according to an embodiment of the invention as described in the examples below.

FIG. 16 shows a generalized well log for well W1 of FIG. 15 with stratigraphic correlations A and B according to an embodiment of the invention as described in the examples below.

FIG. 17 shows a generalized well log for well W2 of FIG. 15 with stratigraphic correlations A and B according to an embodiment of the invention as described in the examples below.

FIG. 18 shows a generated well log for node GN(1,1) of FIG. 15 by mathematical averaging without applying stratigraphic correlations according to an embodiment of the invention as described in the examples below.

FIG. 19 shows a generated well log for node GN(1,1) of FIG. 15 by applying stratigraphic correlations according to an embodiment of the invention as described in the examples below.

DETAILED DESCRIPTION

Figure 1:
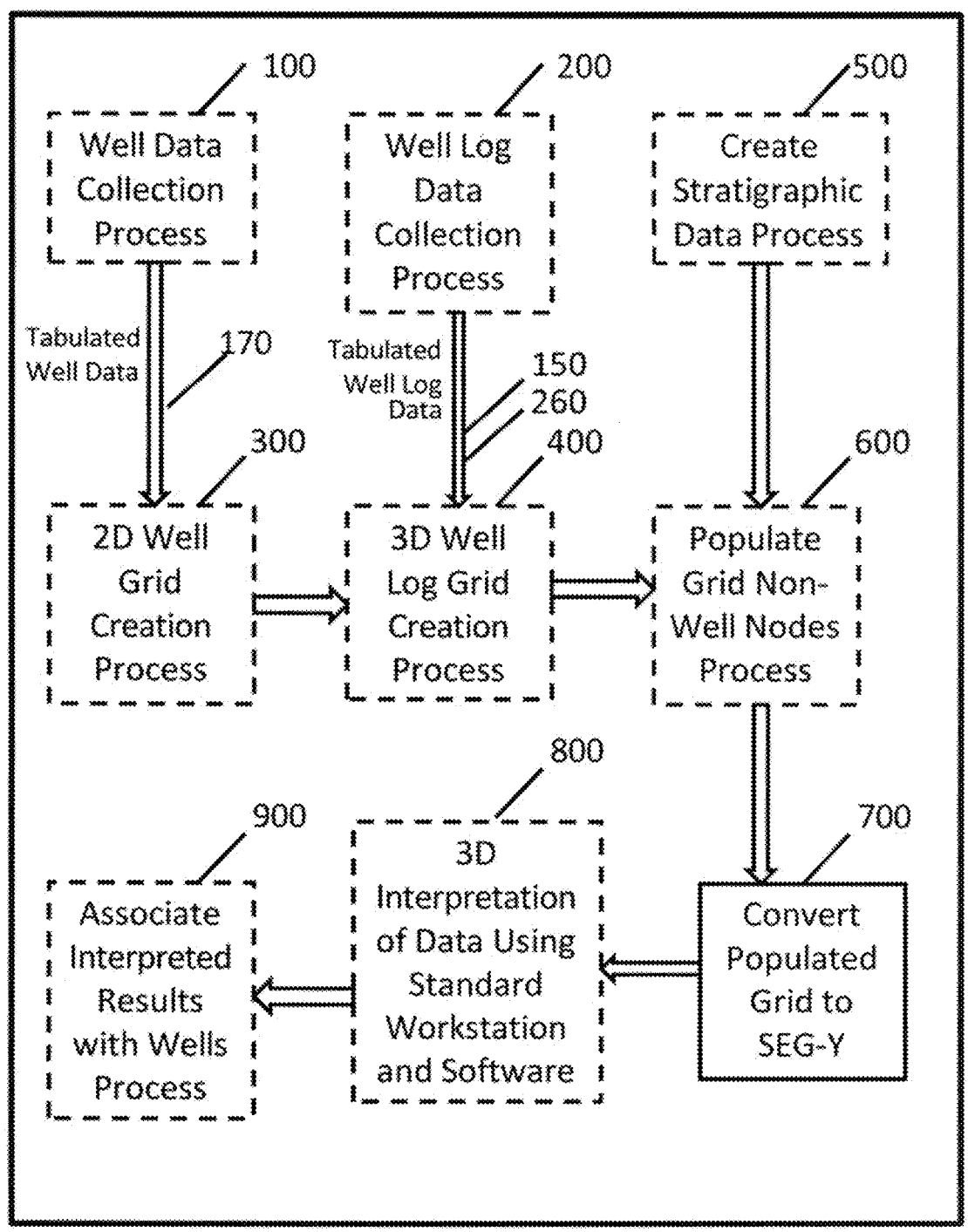
FIG. 1 is a schematic overview of a 3D well log data process according to an embodiment of the invention.

For purposes herein, reference to a point $(x_a, y_a, z_a)$ utilizes the Cartesian coordinate system. Reference to points described by notation $(GN(x_a, y_a), z_a)$ refers to a two dimensional (2D) grid node at point $(x_a, y_a)$ at depth "$z_a$", which are used interchangeably with $(x_a, y_a, z_a)$ notation. For example, the point described by $GN(x_a, y_a)z_a$ is identical to the point described by $(x_a, y_a, z_a)$ in the same data set.

For purposes herein, reference to datapoints being "taken into account" or "considered" to populate x, y, z nodes refers to utilizing or otherwise including the identified data points in one or more calculations, e.g., extrapolation, according to suitable mathematical analysis to generate a well log grid.

For purposes herein, the term "well" refers to wells which may have a system of one or a plurality of communicating wellbores, e.g., a main wellbore communicating with one or more subsidiary or lateral wellbores, which may be either vertical or non-vertical or a combination thereof. A "vertical wellbore" refers to a wellbore which is essentially vertical according to the common understanding of the term in the art and/or, in the context of the present invention, a wellbore or contiguous portion thereof that is closest to the same x, y grid nodes at all depth increments for the purposes of the grid node assignment step. Likewise, a "non-vertical wellbore," also referred to as a directional well or wellbore, may comprise essentially vertical portions in addition to portions having a horizontal component and/or a vertical and a horizontal component with respect to the origin of the well where the main wellbore penetrates the Earth's crust.

In embodiments of the process, well data may comprise the attributes from one or more non-vertical wellbores associated with an ordered collection of values of the x, y, z datapoints, defining a wellbore path of the one or more non-vertical wellbores. In embodiments the process may further comprise processing (one or more) wellbore directional surveys for the one or more non-vertical wellbores to associate a measured wellbore depth with the x, y, z datapoint values defining the wellbore path of the one or more non-vertical wellbores.

In embodiments of the process, the attributes comprise tabulated well log data, whereby the 3D well log grid comprises a matrix of x, y, z grid nodes populated with tabulated well log data assigned to the single-well x, y grid nodes. In embodiments, the attributes comprise stratigraphic correlations, whereby the 3D well log grid comprises a matrix of x, y, z grid nodes populated with stratigraphic correlations assigned to the single-well x, y grid nodes.

In embodiments, the process further comprises populating non-datapoint nodes with well log data extrapolated from single-well nodes. In embodiments, the process further comprises converting the all-node-populated 3D matrix of well log data to a seismic data format.

In embodiments of the process, the step of assigning x, y, z datapoints from wells to closest x, y nodes in the grid, where a plurality of x, y, z datapoints from the same well are closest to the same x, y node, comprises assigning a closest one of the plurality of the x, y, z datapoints from the same well to the x, y node. In embodiments of the process, the remaining one(s) of the plurality of x, y, z datapoints from the same well closest to the same x, y, z node not assigned to the closest x, y node in step b are taken into account to populate the remaining x, y, z nodes.

In embodiments, the process further comprises calculating a path of one or more non-vertical wellbores in the dataset for which a directional survey is available, and using the calculated path to determine the closest x, y node to the x, y, z datapoints for the one or more non-vertical wellbores for which a directional survey is available in step b, e.g., assigning x, y, z datapoints from wells from a dataset of well data comprising attributes associated with the x, y, z datapoints, to closest x, y nodes in the grid, wherein the x, y, z datapoints from a plurality of the wells are spaced away from the closest x, y grid nodes.

In embodiments the dataset comprises one or more non-vertical wellbores for which no directional survey is available, and the process further comprises, with respect to non-vertical wellbores for which no wellbore directional survey is available, excluding from step b at least some of the x, y, z datapoints for the non-vertical wellbores for which no directional survey is available. In alternative embodiments where the dataset comprises one or more non-vertical wellbores for which no directional survey is available, the process further comprises, with respect to the non-vertical wellbores for which no wellbore directional survey is available, considering in step b all of the x, y, z datapoints for the non-vertical wellbores for which no directional survey is available, as x, y, z datapoints from a vertical wellbore.

In embodiments of the process, wherein the assignment of x, y, z datapoints from the wells to the closest x, y grid nodes in step b, where a plurality of x, y, z datapoints from the same well are closest to the same x, y grid node at a common z increment, the process comprises assigning a closest one of the plurality of the x, y, z datapoints from the same well to the x, y node at the common z increment.

In embodiments, the remaining one(s) of the plurality of x, y, z datapoints, from the same wellbore closest to the common z increment at the same x, y grid node not assigned to the closest x, y node at the common z increment in step b, are taken into account in extrapolating data to populate the remaining x, y grid nodes.

In embodiments, the process further comprises calculating a path of the one or more non-vertical wellbores for which a directional survey is available, and using the calculated path to determine the closest x, y grid node to the x, y, z datapoints for the one or more non-vertical wellbores for which a directional survey is available in step b.

In embodiments, the process further comprises, with respect to non-vertical wellbores for which no wellbore directional survey is available, excluding from step b all of the x, y, z datapoints for the non-vertical wellbores for which no directional survey is available. In alternative embodiments, the process further comprises, with respect to non-vertical wellbores for which no wellbore directional survey is available, considering in step b all of the x, y, z datapoints for the non-vertical wellbores for which no directional survey is available, as x, y, z datapoints from a vertical wellbore.

In embodiments of the process, the well data comprise well log data. In embodiments, the well log data comprise stratigraphic correlations by wellbore, whereby the x, y, z datapoints assigned to the x, y, z nodes in step b comprise the stratigraphic correlations.

With reference to FIG. 1, the steps of the 3D-log process according to embodiments of the invention are shown in block form in which depth dependent measurements from a randomly spaced collection of wellbores are used to create a continuous volume of data, also referred to herein as a 3D well log grid, which may be in the form of machine readable data in a format that can be loaded into one or more software applications suitable to interpret, analyze, manipulate and visualize a 3D-well log grid representative of a seismic or other suitable dataset.

As shown in FIG. 1, in embodiments the process may include a well data collection process 100 in which a data set, e.g., an ASCII dataset of tabulated well data 170 is produced which is then utilized in a 2D well grid creation process 300. The 2D well grid is then utilized in a 3D well log grid creation process 400 which also utilizes a data set of well log data, e.g., an ASCII dataset of tabulated well log data, one for each well, 260 obtained from a well log data collection process 200. The tabulated well log data 260 may further include one or more wellbore directional surveys 150. In addition, the process may comprise a process step which creates stratigraphic data 500, which may be utilized along with the output of the 3D well log grid creation process 400 in a process to populate grid non-well nodes 600. The process may further comprise a conversion step 700 in which the output of the populate grid non-well nodes process 600 is converted from the populated grid to SEG-Y or other data formats. The output of the conversion step 700 may then be utilized in an interpretation step 800 in which 3D interpretation of data using standard workstation software is utilized. In embodiments, the results of the interpretation step 800 may then be associated and interpreted with a wells process in an association step 900.

Figure 2:
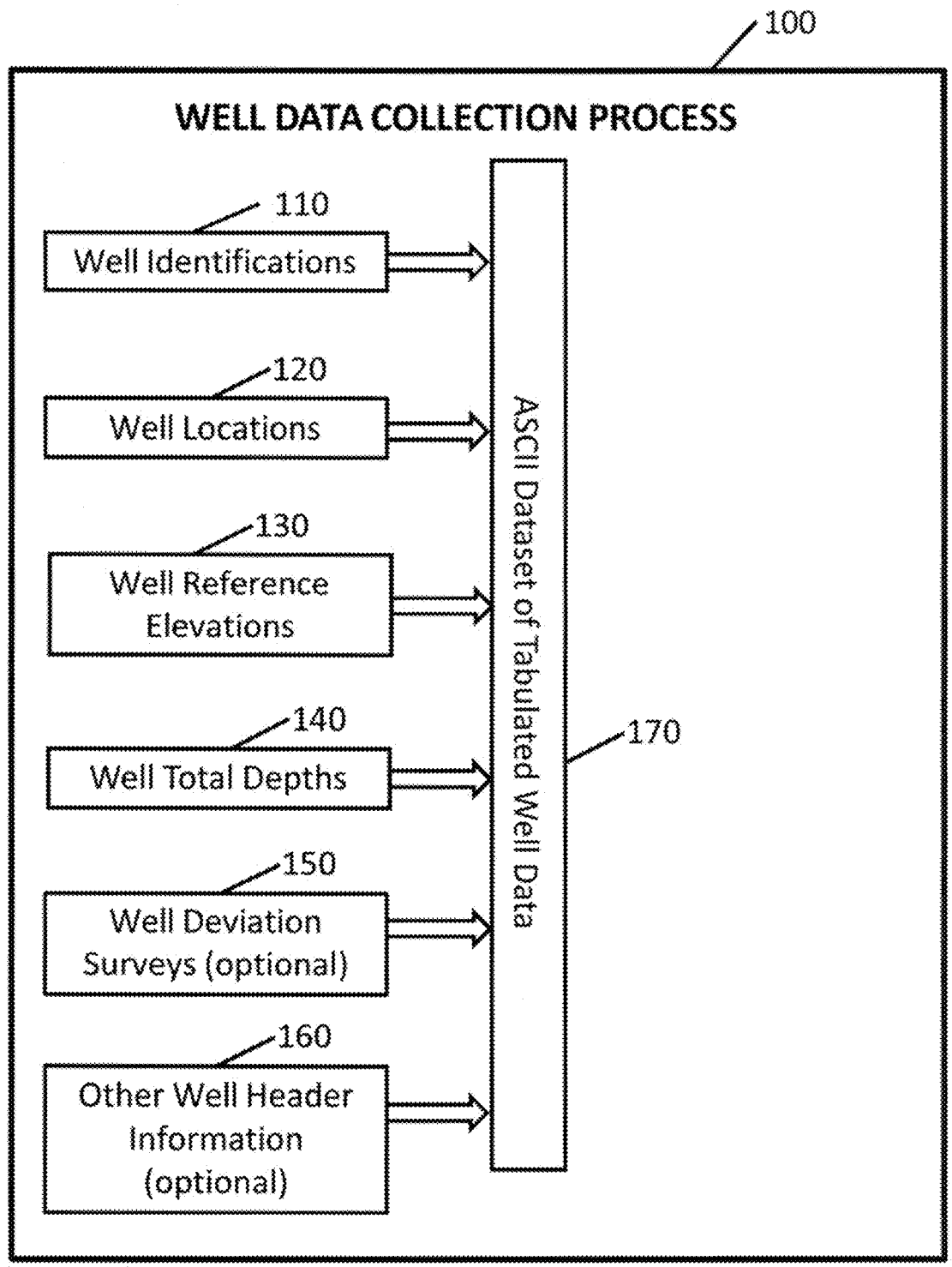
FIG. 2 is a schematic diagram of a general well data collection process according to an embodiment of the invention.

As shown in FIG. 2, the well data collection process 100 may include data relative to well identifications 110, well locations 120, well reference elevations 130, well total depths 140, wellbore directional surveys 150, and/or other well header information 160 readily understood by one of skill in the art. These data are then assembled and organized into a dataset of tabulated well data 170.

The reference elevation 130 (FIG. 2), i.e., the elevation above mean sea level from which borehole measurements are taken, of each well to be used, in one embodiment is considered by the process to produce the 3D well log grid.

Figure 3:
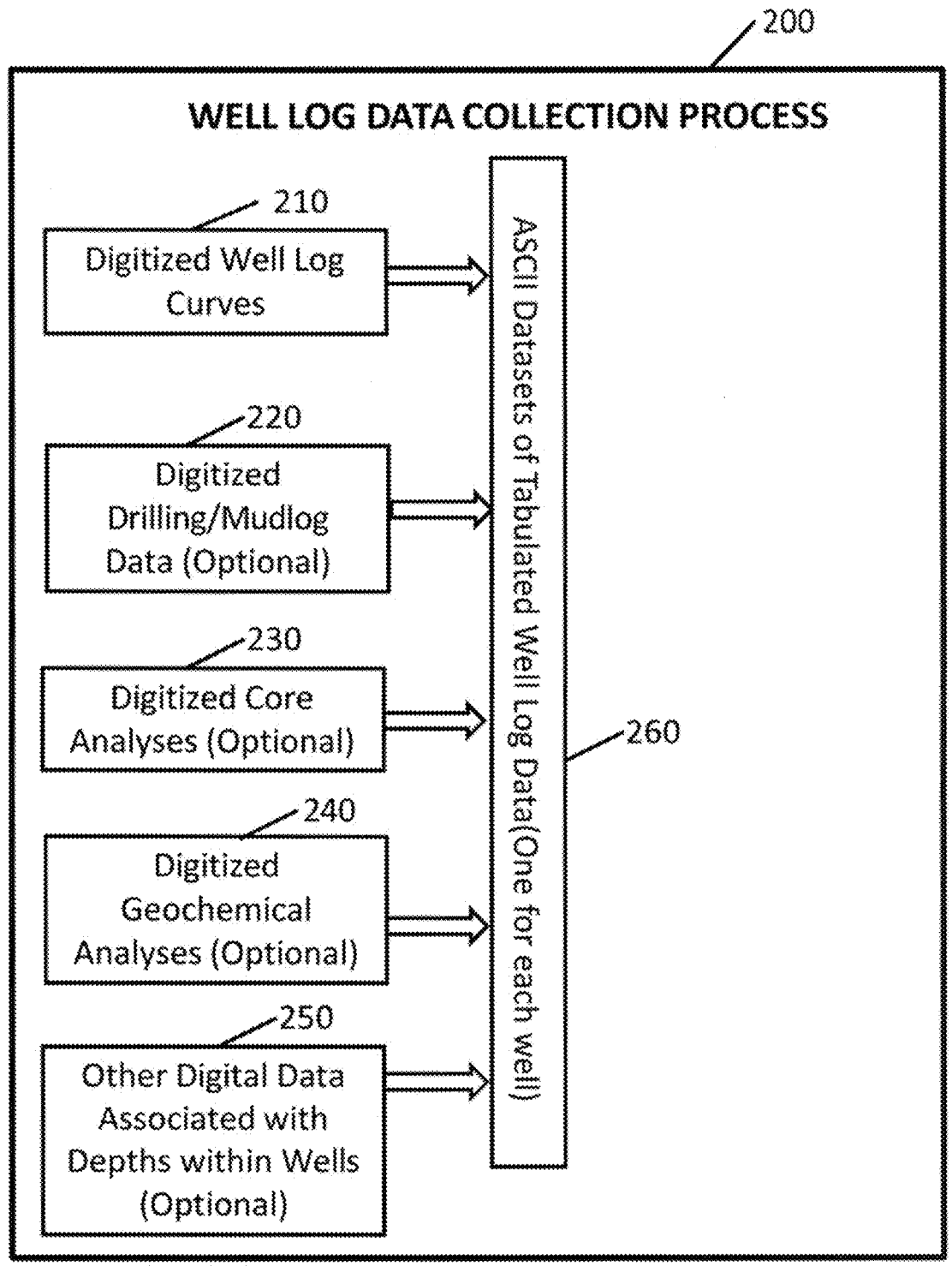
FIG. 3 is a schematic diagram of a well log data collection process according to an embodiment of the invention.

As shown in FIG. 3, in an embodiment, the well log data collection process 200 may utilize digitized well log curves 210, digitized drilling/mudlog data 220, digitized core analysis 230, digitized geochemical analysis 240, and/or other digital data 250 associated with depths within wells as readily understood by one of skill in the art. These data are then assembled and organized into a dataset of tabulated well log data 260, one for each well.

Examples can include geophysical well-log curves 210 collected from wire-line logging of wellbores, core analyses performed on cores collected during drilling of wells, and virtually any other data attribute that can be quantified and associated with a depth within a wellbore.

Figure 4:
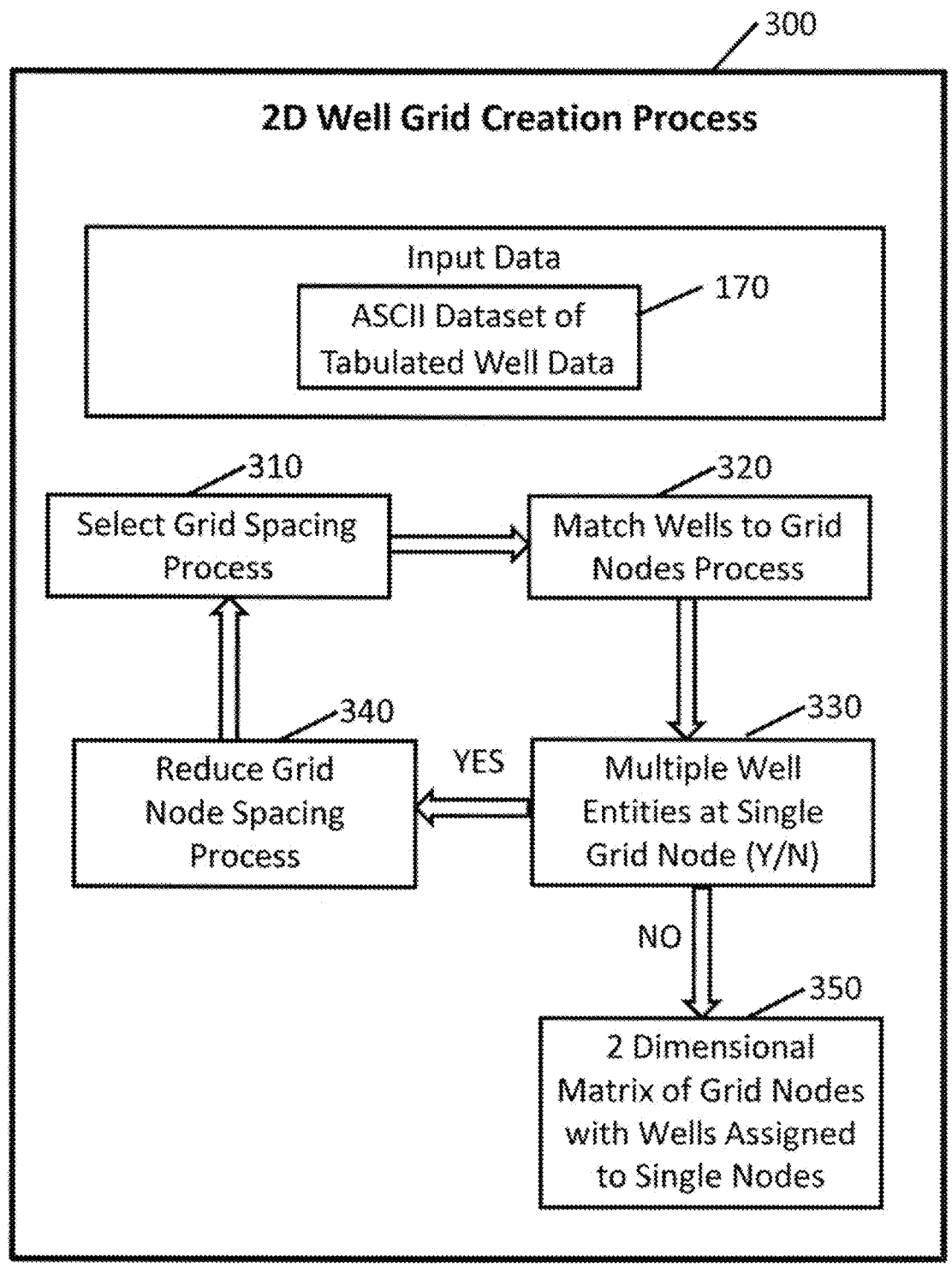
FIG. 4 is a schematic diagram of a 2D well grid creation process according to an embodiment of the invention.

As shown in FIG. 4, the 2D well grid creation process 300 includes input data of tabulate well data 170 and includes a select grid spacing process 310 in which a uniform grid with constant spacing between nodes is superimposed over an area that encompasses all wellbores to be used. Common grid node spacings can be from 10 to 100 meters, but smaller or larger spacings can be used if desired. In one embodiment, a uniform grid spacing can include spacing that can be the same or different with respect to the X- and Y-axes, e.g. a relatively larger spacing along one axis than the other. These data are then utilized in a match of wells to grid nodes in process 320 which is then utilized in a decision process 330 in which it is determined if multiple well entities are assigned at a single grid node. If this is true, these data are further evaluated in a reduction process 340 in which the grid spacing is reduced and then utilized in the select grid spacing process 310 in an iterative process until the decision process 330 results in a determination that each well entity is assigned to only one grid node, which data are then utilized in an assignment step 350 in which a 2 dimensional matrix of grid nodes with wells assigned to single nodes is produced.

Figure 5:
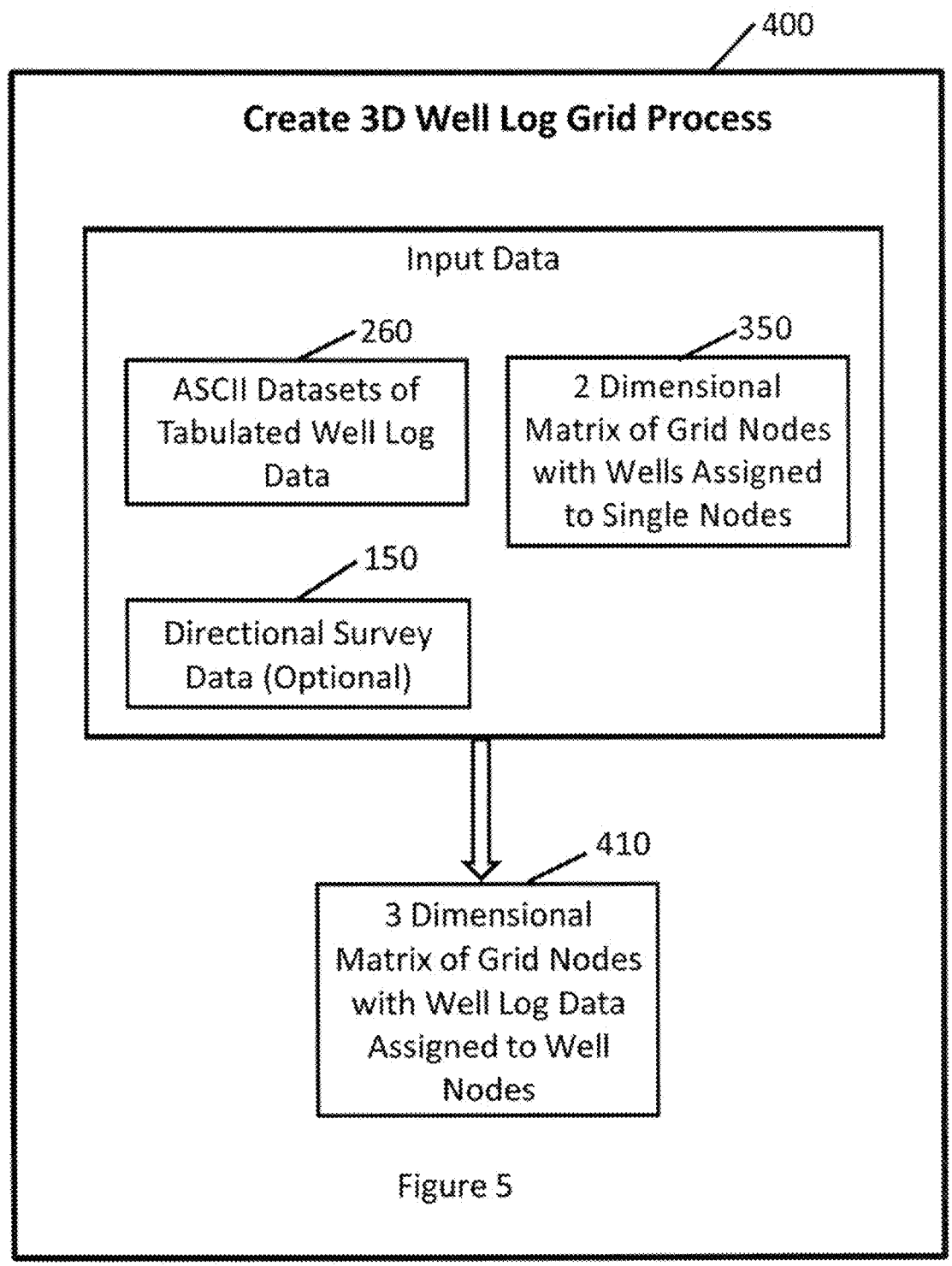
FIG. 5 is a schematic diagram of a 3D well grid creation process according to an embodiment of the invention.

As shown in FIG. 5, in embodiments, these data of the 2 dimensional matrix of grid nodes with wells assigned to single nodes of assignment step 350, the dataset of tabulated well log data 260 and directional survey data 150 are then utilized in the create 3D well log grid process 400, which includes an assignment step 410 to produce a 3 dimensional matrix of grid nodes with well log data assigned to well nodes.

Figure 6:
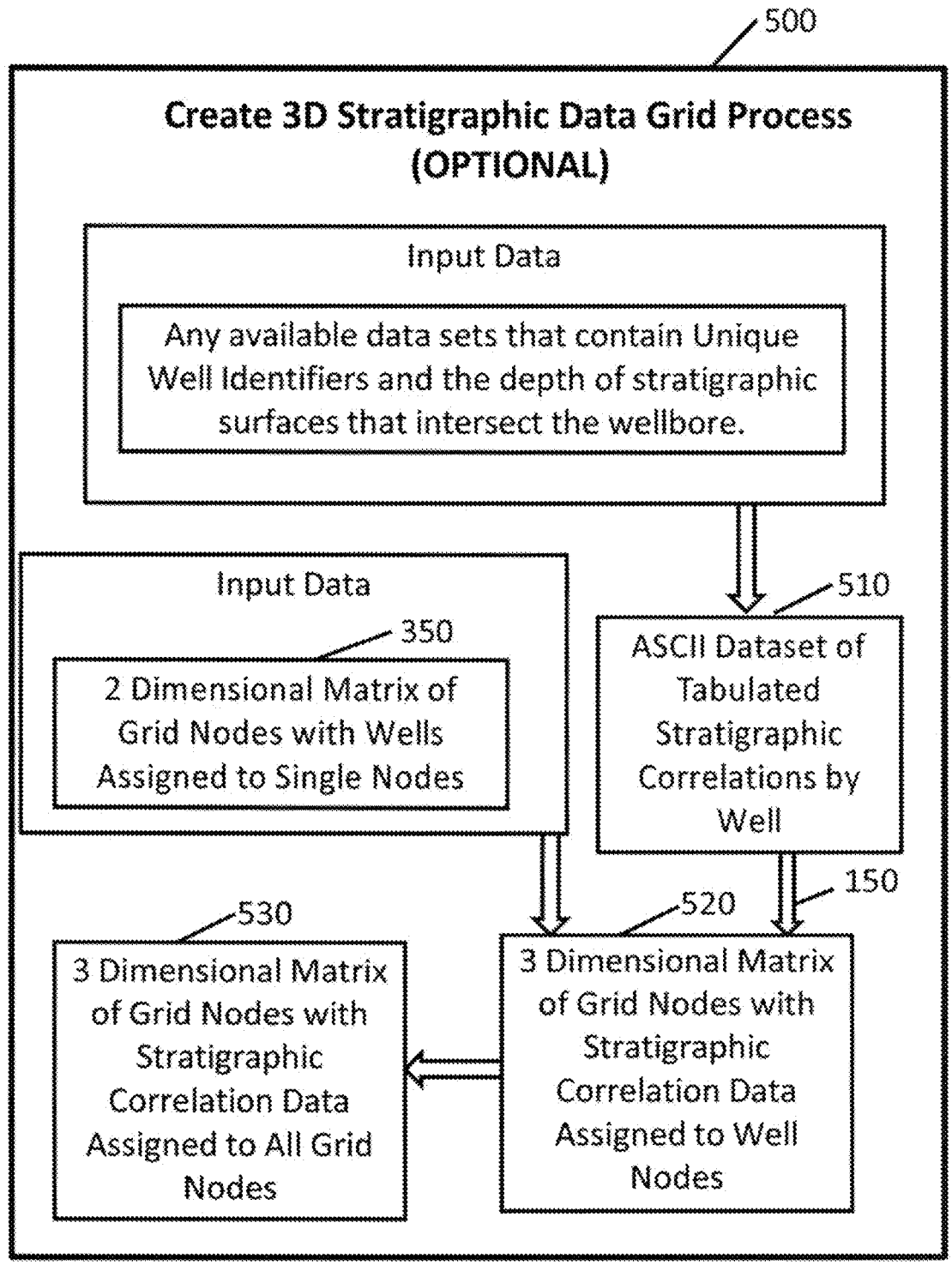
FIG. 6 is a schematic diagram of an alternative 3D well grid creation process involving stratigraphic correlations according to an embodiment of the invention.

As shown in FIG. 6, in embodiments, the process further includes a 3D stratigraphic data grid creation process 500, which includes input of any available data sets that contain unique well identifiers and the depth of stratigraphic surfaces that intersect the well. These input data are then tabulated in an ASCII dataset of tabulated stratigraphic correlations by well 510, which may include wellbore directional data 150 which is utilized along with input data of 2 dimensional matrix of grid nodes with wells assigned to single nodes 350 (cf. FIG. 4) in an assignment process 520 in which a 3 dimensional matrix of grid nodes with stratigraphic correlation data is assigned to well nodes. These data are then utilized in process 530 to produce a 3 dimensional matrix of grid nodes with stratigraphic correlation data assigned to all grid nodes.

Figure 7:
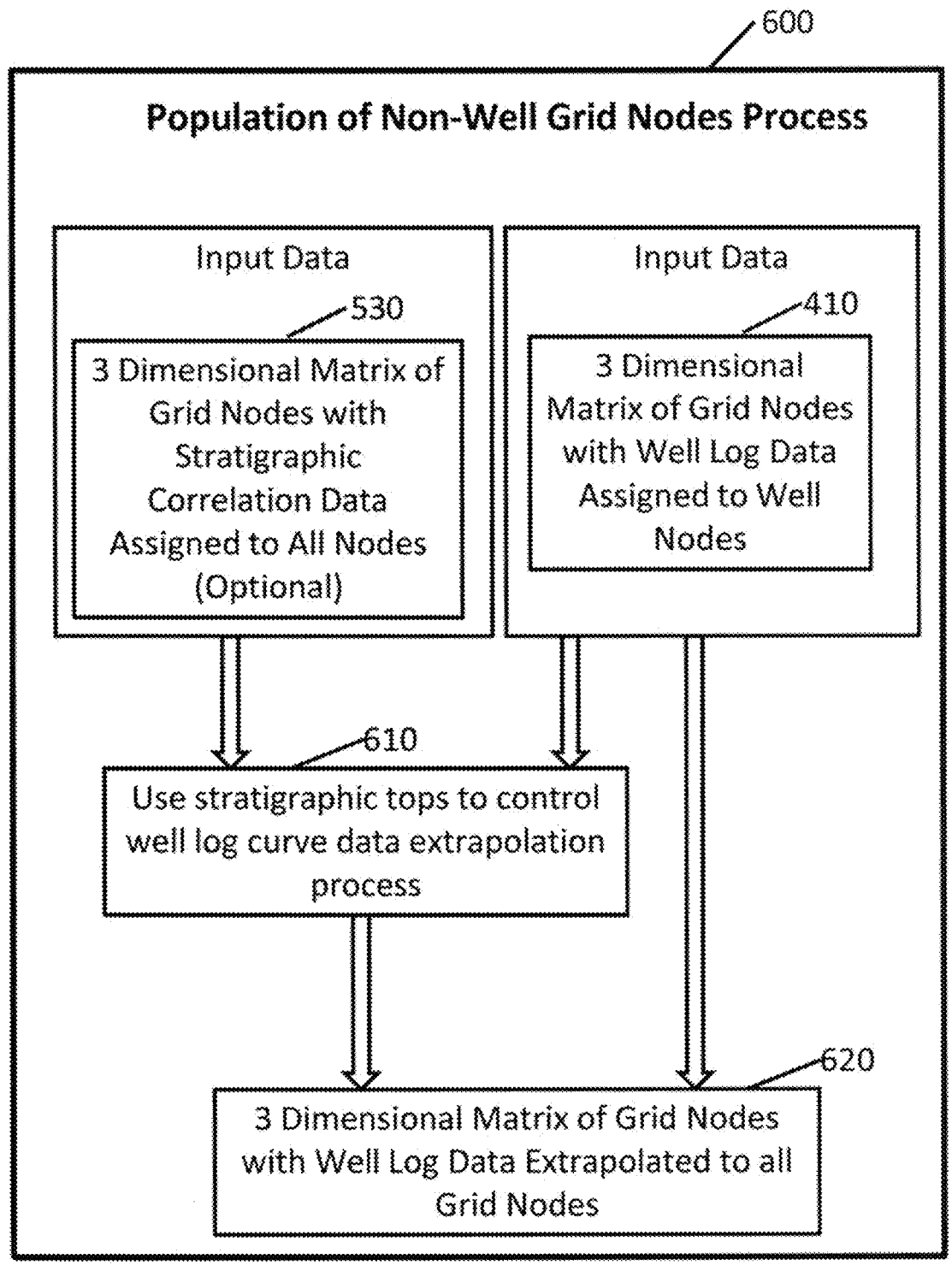
FIG. 7 is a schematic diagram of a process to populate non-well grid nodes according to an embodiment of the invention.

As shown in FIG. 7, in embodiments, the process may further include a population of non-well grid nodes process 600 which utilizes input data from 3 dimensional matrix of grid nodes with stratigraphic correlation data assigned to all grid nodes from step 530, a 3 dimensional matrix of grid nodes with well log data assigned to well nodes from step 410, which may be utilized in a use of stratigraphic tops to control well log curve data extrapolation in process 610 which data may be used in process to produce a 3 dimensional matrix of grid nodes with well log data extrapolated to all grid nodes 620.

Figure 8:
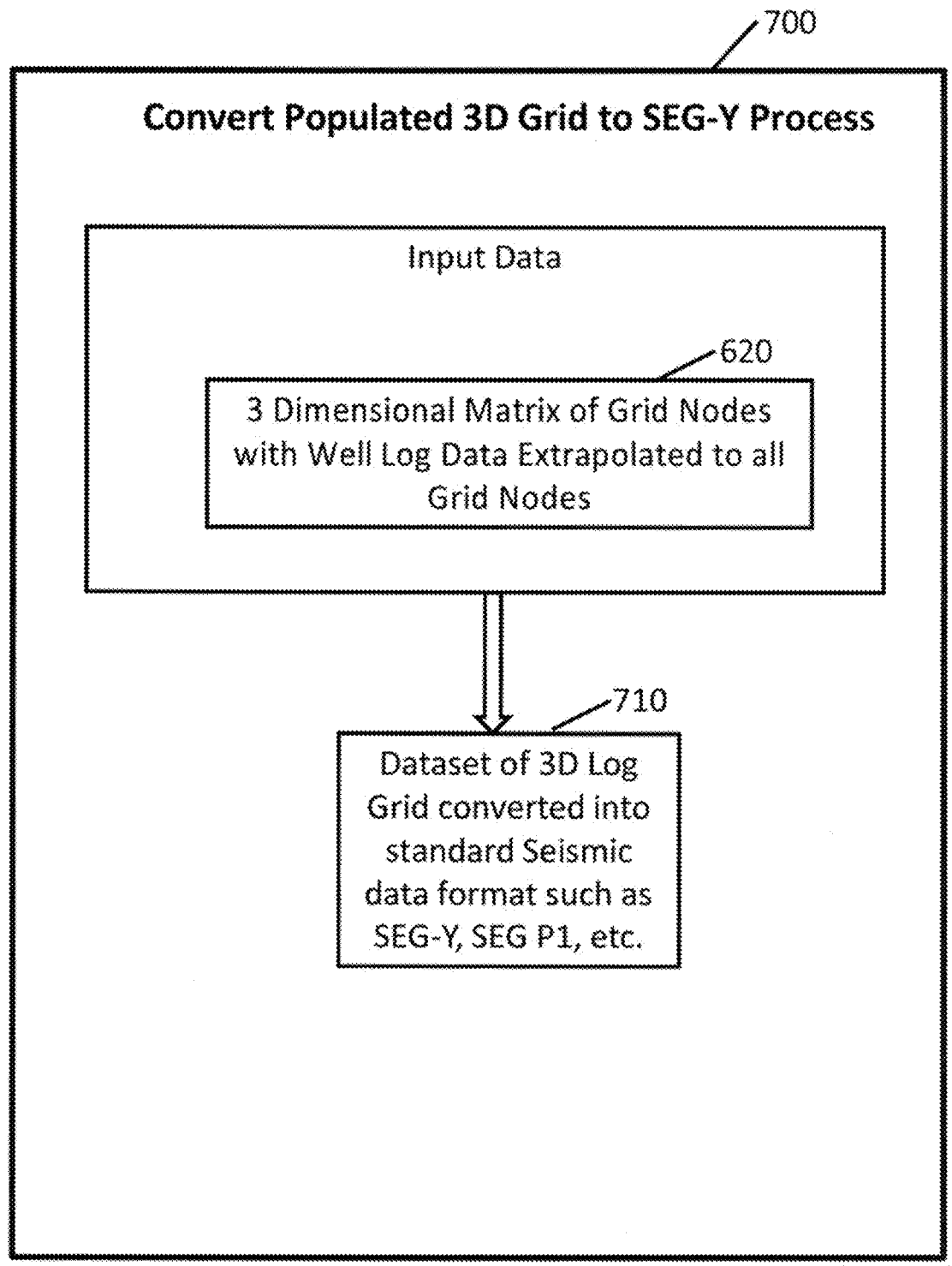
FIG. 8 is a schematic diagram showing conversion of a 3D well grid into a standard seismic data format according to an embodiment of the invention.

As shown in FIG. 8, the conversion of populated 3D grid data to SEG-Y in process 700 may include the input of the well log data extrapolated to all grid nodes 620 to produce a dataset of 3D log grid converted into standard seismic data format such as SEG-Y, SEG P1, and/or the like 710.

Figure 9:
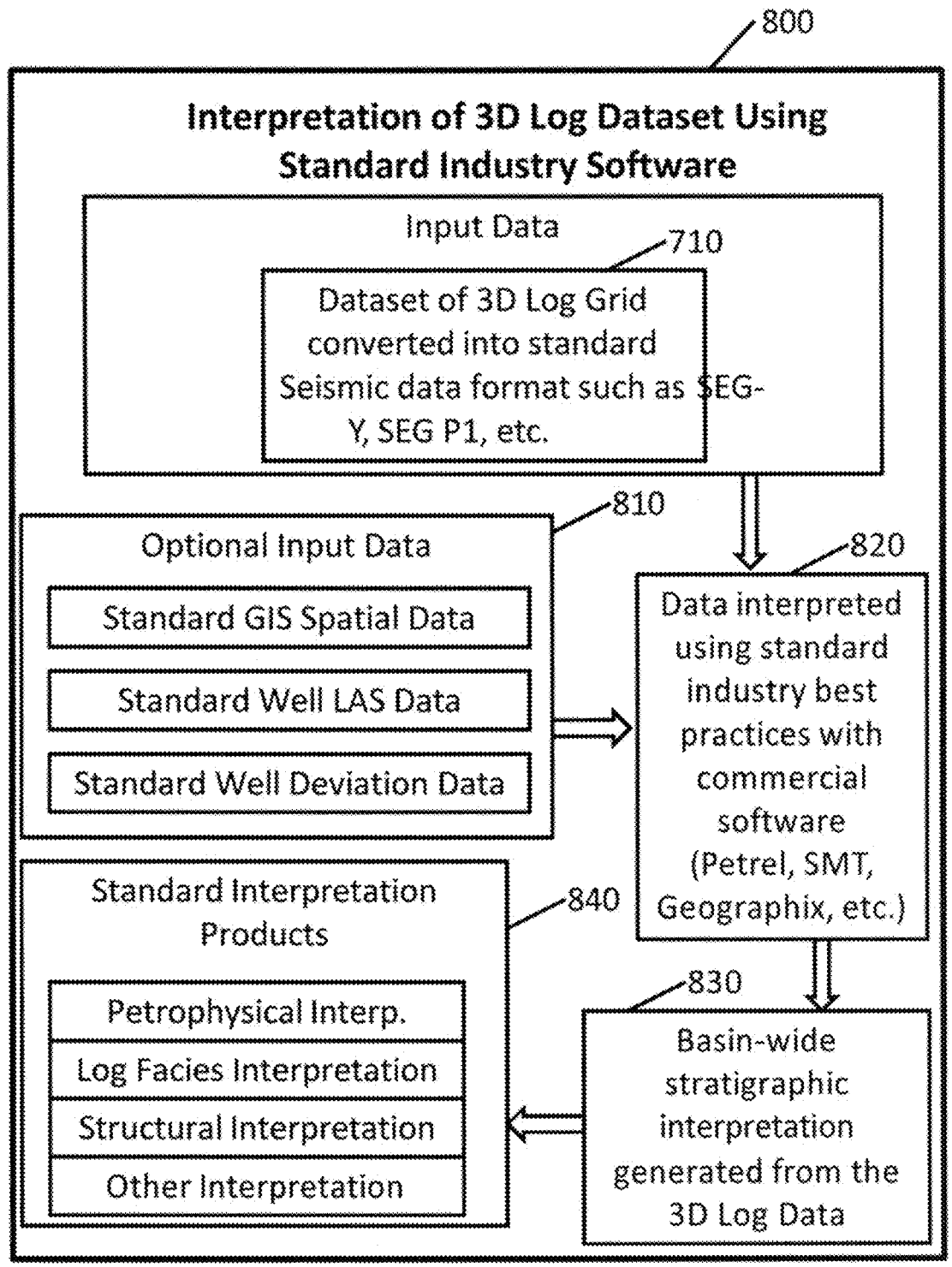
FIG. 9 is a schematic diagram of interpretation of 3D log dataset in standard seismic data format using standard industry software according to an embodiment of the invention.

As shown in FIG. 9, interpretation step 800 may include input of dataset of 3D log grid converted into standard seismic data format such as SEG-Y, SEG P1, and/or the like 710, which may be utilized in a data interpretation step 820 in which data is interpreted using standard industry best practices with commercial software, e.g., Petrel™, SMT™, Geographix™, and/or the like. In addition, interpretation step 820 may utilize other input 810 which may include standard GIS spatial data, standard well LAS data, standard well deviation data, and/or the like. These data of the data interpretation step 820 may then be utilized in a generation step 830 to generate a basin-wide stratigraphic interpretation generated from the 3D log data, which may be further utilized in another interpretation step 840 according to standard interpretation products including petrophysical interpretation, log facies interpretation, structural interpretation, and/or other interpretation readily understood by one of skill in the art.

Figure 10:
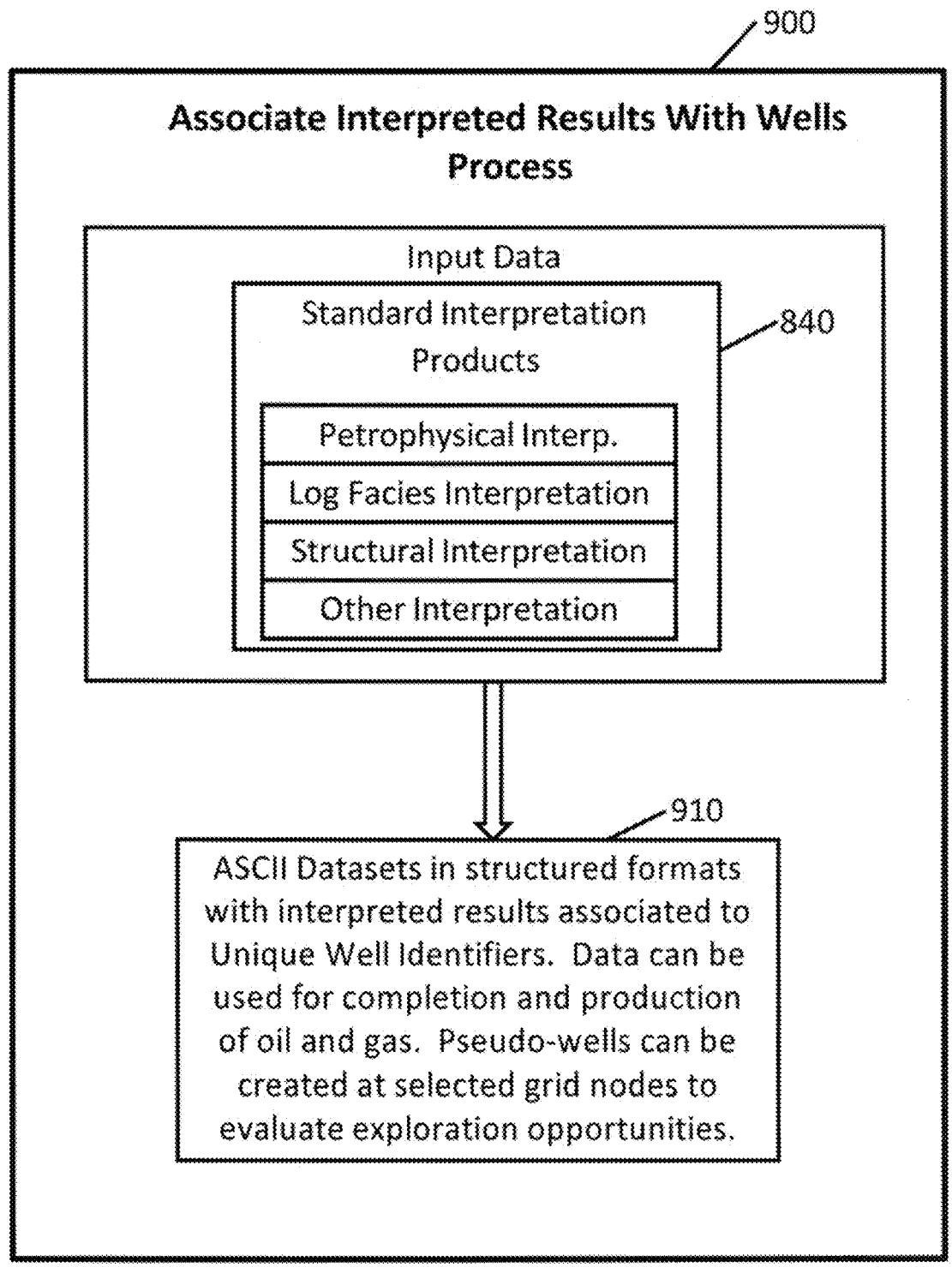
FIG. 10 is a schematic diagram of a process to associate the interpretations of FIG. 9 with specific wells (or pseudo-wells) according to an embodiment of the invention.

As shown in FIG. 10, in an embodiment, the association step 900 may include input data from interpretation step 840 according to standard interpretation products including petrophysical interpretation, log facies interpretation, structural interpretation, and/or other interpretation readily understood by one of skill in the art, which may then utilize ASCII datasets in structured formats with interpreted results associated to unique well identifiers in an analysis step 910, wherein data can be used for completion and production of oil and gas, pseudo-wells can be created at selected grid nodes to evaluate exploration opportunities, and/or the like.

In an embodiment, each well and/or wellbore can have a unique identifier carried as an attribute of the node nearest to its actual location. This unique identifier can be the American Petroleum Institute (API) identifier, (available from the Professional Petroleum Data Management (PPDM) Association, "The US Well Number Standard: An Identifier for Petroleum Industry Wells in the USA—2014", available at http://dl.ppdm.org/dl/836 (June, 2014), which is incorporated by reference herein) or any other suitable identifier.

In an embodiment, no two wells can be assigned to the same grid node, e.g., a datapoint from one well at most can be assigned to a particular grid node. In another embodiment, closest datapoints from only one well can be assigned to a particular grid node. The grid spacing can be reduced in an iterative process in one embodiment, or one of the wellbores can be moved to the next nearest available node in an alternative or additional embodiment.

In an embodiment, each grid node that has not been assigned to an actual wellbore can be populated with data using various techniques such as, for example, triangulation, nearest neighbor, and like algorithms, including combinations of such techniques. In embodiments utilizing an algorithm of triangulation, for example, the data values for the unpopulated grid nodes are calculated using a weighting function based upon the distance between it and all grid nodes with assigned data. In embodiments, these data may be kept in an array format for reference within the processing.

For example, in embodiments the grid node arrangement is described by:

$$GN(0,n)=DF/f(DN);$$

wherein

GN is the array of grid nodes containing the weighting function values;

f(DN) is a function that can be allocated prior to processing, which allows for flexibility in determining whether a linear or exponential data relationship exists between the grid nodes;

DN is the distance between the grid node being evaluated and a grid node with an assigned well; and DF is a weighting constant that can be allocated prior to processing.

According to an embodiment, a data value can be determined for each depth increment at each wellbore by using the grid node (GN) values or x, y, values calculated, and performing a summation of all wellbore data at the same measured depth "z" multiplied by the respective GN value for wells within a defined search radius. In an embodiment, the results can be assigned to a trace array for each bin or other data identifier.

As shown in FIG. 8, in embodiments, SEG-Y files, SEG P1 files, and/or the like may be generated for the 3D well log grid, also referred to as the 3D matrix of well data and/or the 3D-log survey.

After interpretation in any standard exploration workstation according to the embodiment of FIGS. 9 and 10, the interpretations are output and reformatted for loading into well databases and interpretation systems.

In embodiments, a wellbore assigned to a node may comprise one or more non-vertical wellbores, which in an embodiment may further include a directional survey for one or more of the non-vertical well-bores from which it is possible to calculate the path of the well-bores as necessary to populate the 3D well log grid. In embodiments, the non-vertical well-bore data may be incorporated into 3D well log grid using any mathematically appropriate method, examples include average angle analysis, balanced tangential analysis, minimum curvature analysis, radius of curvature analysis, and/or tangential analysis, as readily understood by one having minimum skill in the art, and as described in "American Petroleum Institute Bulletin D20-1985", available from the American Petroleum Institute, www.api.org, which is fully incorporated by reference herein, or any other suitable calculation method. The calculated paths can then be used to determine the nearest intersecting node within the 3D well log grid for each well log curve data point associated with the wellbore.

Figure 22:
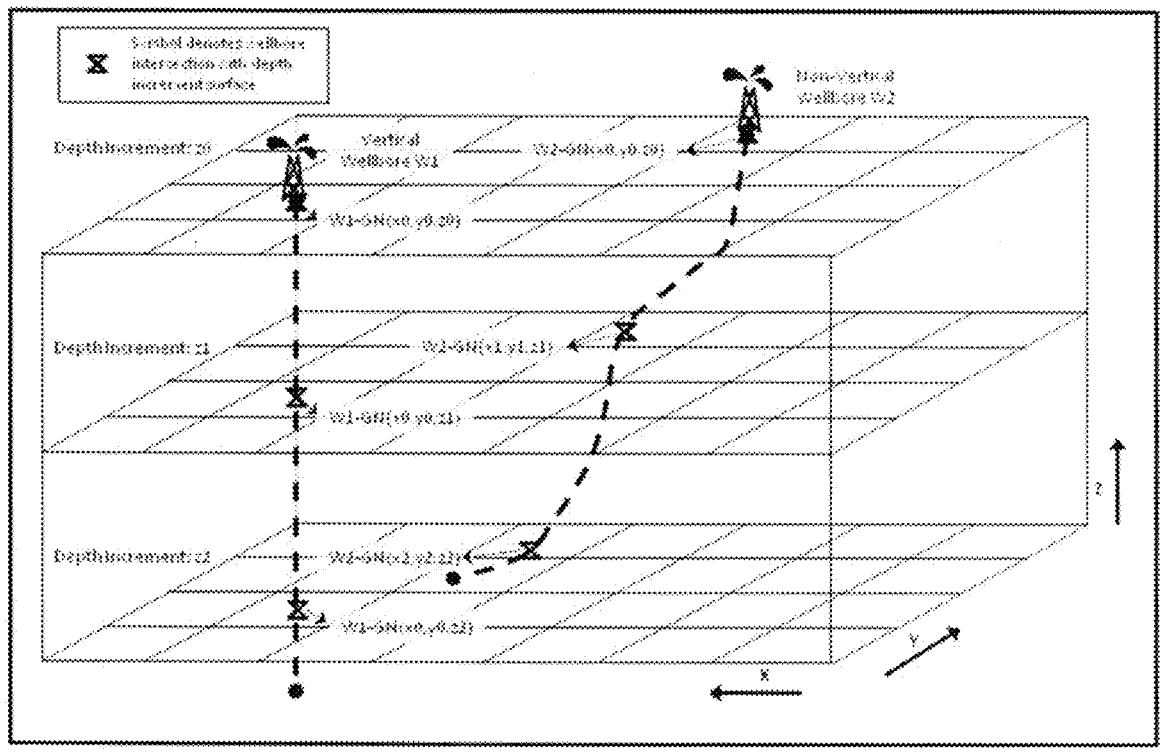
FIG. 22 schematically shows the assignment of well log values to grid nodes when the data include vertical and non-vertical wellbores with a plurality of datapoints in a common z increment according to an embodiment of the invention.

In embodiments, a non-vertical wellbore path in a well may populate more than one node for any given depth increment associated with the 3D well log grid, as demonstrated in FIG. 22, which shows the assignment of well log values to grid nodes during the 3D well log grid creation process for a dataset of wells comprising both vertical and non-vertical wellbores.

Figure 23:
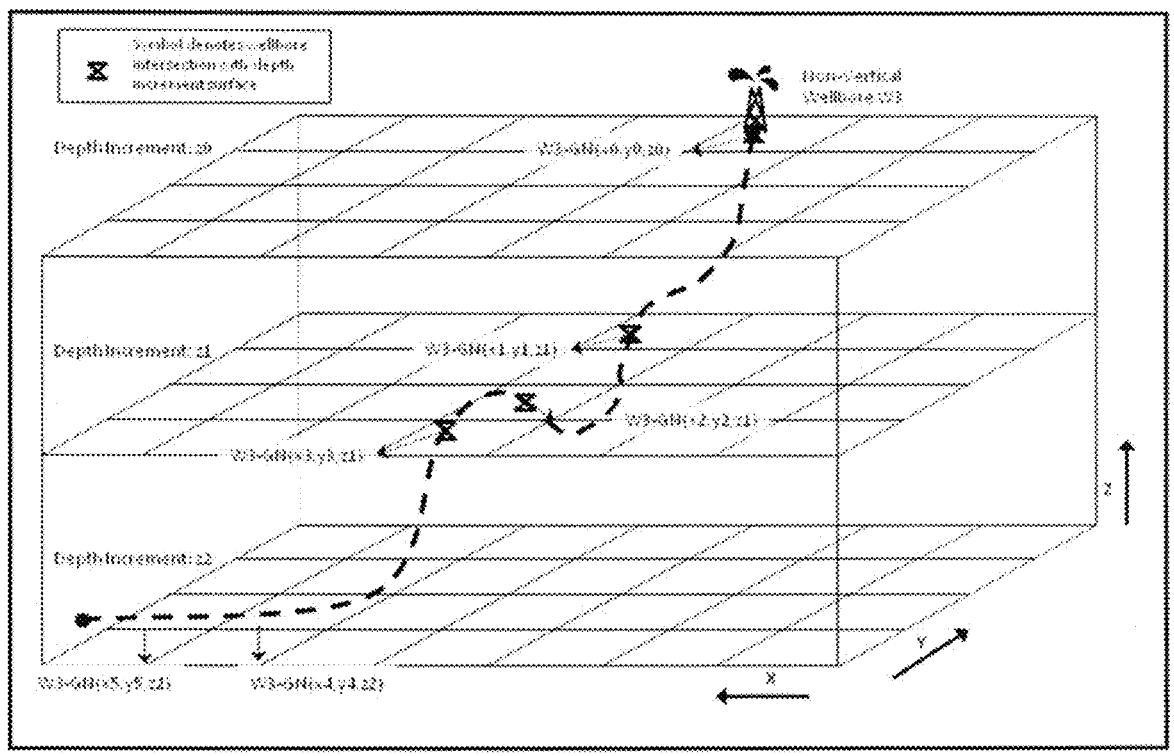
FIG. 23 schematically shows the assignment of well log values to grid nodes when the data include non-vertical wellbores with a plurality of datapoints adjacent to a grid node according to another embodiment of the invention.

In similar embodiments, a non-vertical wellbore path may populate an x,y node associated with the 3D well log grid in a given depth increment using well log values from a closest available datapoint in or adjacent to a given depth increment, as demonstrated in FIG. 23, which shows the assignment of well log values to grid nodes at a given depth increment which is not intersected by a non-vertical wellbore.

In embodiments, when a wellbore directional survey is not available for a non-vertical wellbore, the data related to such a non-vertical wellbore may be totally excluded, partially excluded, treated as a vertical wellbore, or any combination thereof when determining and populating the 3D well log grid according to embodiments of the process.

In embodiments, non-vertical wellbores may be utilized to project assigned grid node values into adjacent vertical as well as horizontal non-assigned grid nodes. In embodiments, because the deposition of geologic units tends to have much greater vertical versus lateral variability, the process may further comprise moderation of vertical projections by a power function. The f(DN) parameter in the equation:

$$GN_{(0,n)}=DF/f(DN)$$

may be considered to have a delta-Z component that allows for projection of grid node values to non-assigned grid nodes at offset depth intervals. While this feature may have little effect for vertical wells, the process according to such embodiments provides for a more accurate population of non-assigned grid nodes when wells with non-vertical wellbores are present.

Accordingly, the invention provides the following embodiments:

A. A process to create a well grid comprising the steps of:
  a) selecting an initial x, y grid spacing,
  b) assigning x, y, z datapoints, from wells from a dataset of well data comprising attributes associated with the x, y, z datapoints, to closest x, y nodes in the grid, wherein the x, y, z datapoints from a plurality of the wells are spaced away from the closest x, y grid nodes,
  c) if x, y, z datapoints from a plurality of wells are assigned to a single x, y grid node after completing step b, narrowing the x, y grid spacing and repeating step b until the x, y, z datapoints from no more than one well are assigned to any one single-well x, y grid node, and
  d) populating the respective single-well x, y grid nodes with the attributes associated with the assigned x, y, z datapoints to form a matrix of x, y, z grid nodes populated with the attributes to generate a 3D well log grid.

B. The process of embodiment A, wherein the well data comprise the attributes from one or more non-vertical wellbores associated with an ordered collection of values of the x, y, z datapoints defining a wellbore path of the one or more non-vertical wellbores.

C. The process according to embodiment A or B, further comprising processing wellbore direction surveys for the one or more non-vertical wellbores to associate a measured wellbore depth with the x, y, z datapoint values defining the wellbore path.

D. The process according to any one of embodiments A through C, wherein the attributes comprise tabulated well log data, whereby the 3D well log grid comprises a matrix of x, y, z grid nodes populated with tabulated well log data assigned to the single-well x, y grid nodes.

E. The process according to any one of embodiments A through D, wherein the attributes comprise stratigraphic correlations, whereby the 3D well log grid comprises a matrix of x, y, z grid nodes populated with stratigraphic correlations assigned to the single-well x, y grid nodes.

F. The process according to any one of embodiments A through E, further comprising populating non-datapoint nodes with well log data extrapolated from single-wellbore nodes.

G. The process according to any one of embodiments A through F, further comprising converting the all-node-populated 3D matrix of well log data to a seismic data format.

H. The process according to any one of embodiments A through G, wherein the assignment of x, y, z datapoints from non-vertical wellbores to closest x, y nodes in the grid in step b, where a plurality of x, y, z datapoints from the same well are closest to the same x, y node, comprises assigning a closest one of the plurality of the x, y, z datapoints from the same well to the x, y node.

I. The process according to embodiment H, wherein the remaining one(s) of the plurality of x, y, z datapoints, from the same well closest to the same x, y, z node not assigned to the closest x, y node in step b, are taken into account to populate the remaining x, y, z nodes.

J. The process according to any one of embodiments A through I, further comprising calculating a path of one or more non-vertical wellbores in the dataset for which a directional survey is available, and using the calculated path to determine the closest x, y node to the x, y, z datapoints for the one or more non-vertical wellbores for which a directional survey is available in step b.

K. The process according to any one of embodiments A through J, further comprising, with respect to non-vertical wellbores for which no wellbore directional survey is available, excluding from step b at least a portion of the x, y, z datapoints for the non-vertical wellbores for which no directional survey is available.

L. The process according to any one of embodiments A through K, further comprising, with respect to non-vertical wellbores for which no wellbore directional survey is available, considering in step b, at least a portion of the x, y, z datapoints for the non-vertical wellbores for which no directional survey is available, as x, y, z datapoints from a vertical wellbore.

M. A process, comprising the steps of:
associating tabulated well data comprising well log data from a plurality of wells, comprising at least one non-vertical wellbore, associated with unique well and/or wellbore identifiers and stratigraphic correlations by well and/or wellbore with a matrix of x, y grid nodes wherein x, y, z datapoints from no more than one well are assigned to single x, y grid nodes to generate a 3D grid matrix of well log data, wherein the matrix comprises a uniform spacing between the x, y grid nodes with respect to an X-axis and a uniform spacing between the x, y grid nodes with respect to a Y-axis, wherein the spacing with respect to the X- and Y-axes may be the same or different; and generating the uniform grid spacings with respect to the X- and Y-axes by the steps of:
a) selecting an initial 2D grid spacing,
b) assigning x, y, z datapoints from the tabulated well data to closest x, y grid nodes; and
c) if x, y, z datapoints from a plurality of wellbores are assigned to a single x, y grid node after completing step b, narrowing the grid spacing and repeating step b until x, y, z datapoints from no more than one wellbore are assigned to any x, y grid node.

N. The process of embodiment M, wherein the assignment of x, y, z datapoints from the non-vertical wellbores to the closest x, y grid nodes in step b, where a plurality of x, y, z datapoints from the same wellbore are closest to the same x, y grid node at a common z increment, comprises assigning a closest one of the plurality of the x, y, z datapoints from the same wellbore to the x, y node at the common z increment.

O. The process according to embodiment M or N, wherein the remaining one(s) of the plurality of x, y, z datapoints, from the same wellbore closest to the common z increment at the same x, y grid node not assigned to the closest x, y node at the common z increment in step b, are taken into account in extrapolating data to populate the remaining x, y grid nodes.

P. The process according to any one of embodiments M through O, further comprising calculating a path of the one or more non-vertical wellbores for which a directional survey is available, and using the calculated path to determine the closest x, y grid node to the x, y, z datapoints for the one or more non-vertical wellbores for which a directional survey is available in step b.

Q. The process according to any one of embodiments M through P, further comprising, with respect to non-vertical wellbores for which no wellbore directional survey is available, excluding from step b at least a portion of the x, y, z datapoints for the non-vertical wellbores for which no directional survey is available.

R. The process according to any one of embodiments M through P, further comprising, with respect to non-vertical wellbores for which no wellbore directional survey is available, considering in step b at least a portion of the x, y, z datapoints for the non-vertical wellbores for which no directional survey is available, as x, y, z datapoints from a vertical wellbore.

S. A process, comprising the steps of:
a. selecting an initial 3D grid spacing comprising x, y, z nodes having a uniform grid spacing with respect to an X-axis and with respect to a Y-axis, wherein the grid spacing with respect to the X- and Y-axes may be the same or different;
b. assigning x, y, z datapoints from wells from a dataset of well data to closest x, y, z nodes in the grid, wherein the wells comprise one or more non-vertical wellbores;
c. if x, y, z datapoints from a plurality of wells are assigned to a single x, y, z node after completing step b, narrowing the grid spacing and repeating step b until x, y, z datapoints from no more than one well are assigned to any one x, y, z node, wherein a plurality of the assigned x, y, z datapoints are spaced away from the respective closest x, y, z nodes;
d. populating the closest x, y, z nodes with the well data from the assigned x, y, z datapoints;
e. if any x, y, z nodes remain unpopulated after step d, populating the remaining x, y, z nodes with well data extrapolated from extrapolation data comprising the populated closest x, y, z nodes to generate an all-node-populated 3D matrix of well data; and f. converting the all-node-populated 3D matrix of well data to a seismic data format.

T. The process of embodiment S, wherein the well data comprise well log data.

U. The process according to embodiment S or T, wherein the well log data comprise stratigraphic correlations by wellbore, whereby the x, y, z datapoints assigned to the x, y, z nodes in step b comprise the stratigraphic correlations.

V. The process according to any one of embodiments S through U, wherein the assignment of x, y, z datapoints from non-vertical wellbores from a dataset of well data to closest x, y, z nodes in the grid in step b, where a plurality of x, y, z datapoints from the same well are closest to the same x, y, z node, comprises assigning a closest one of the plurality of the x, y, z datapoints from the same well to the x, y, z node.

W. The process according to any one of embodiments S through V, wherein the remaining one(s) of the plurality of x, y, z datapoints, from the same wellbore closest to the same x, y, z node not assigned to the closest x, y, z node in step b, are taken into account in the extrapolation data to populate the remaining x, y, z nodes in step e.

X. The process according to any one of embodiments S through W, further comprising calculating a path of the one or more non-vertical wellbores for which a directional survey is available, and using the calculated path to determine the closest x, y, z node to the x, y, z datapoints for the one or more non-vertical wellbores for which a directional survey is available in step b.

Y. The process according to any one of embodiments S through W, further comprising, with respect to non-vertical wellbores for which no wellbore directional survey is available, excluding from step d the x, y, z datapoints for the non-vertical wellbores for which no directional survey is available.

Z. The process according to any one of embodiments S through Y, further comprising, with respect to non-vertical wellbores for which no wellbore directional survey is available, considering in step d the x, y, z datapoints for the non-vertical wellbores for which no directional survey is available, as x, y, z datapoints from a vertical wellbore.

1A. The process according to any one of embodiments A through Z, wherein non-vertical wellbores are utilized to project assigned grid node values into adjacent vertical as well as horizontal non-assigned grid nodes.

1B. The process according to embodiment 1A, further comprising moderation of vertical projections by a power function f(DN) according to the equation:

$$GN_{(0,n)}=DF/f(DN)$$

wherein a delta-Z component is employed which allows for projection of grid node values to non-assigned grid nodes at offset depth intervals.

1C. The process according to any one of embodiments A through 1B, wherein the data format comprises SEG-Y or SEG P1.

1D. The process according to any one of embodiments A through 1C, further comprising completion or production of oil and gas wells.

1E. The process according to any one of embodiments A through 1D, wherein the well process comprises the creation of pseudo wells to evaluate exploration opportunities.

1F. A 3D well log grid produced according to the process of any one of embodiments A through 1E.

EXAMPLES

As an example of establishing a single-well, single-node two-dimensional grid, a process according to one embodiment of the invention is applied to hypothetical wells W1, W2, W3 and W4 as shown in FIG. 11. An initial grid is applied with grid nodes GN(0,0) through GN(2,2) as shown in FIG. 12. Next, as shown in FIG. 13, the wells are associated with the closest node, i.e. W1 with GN(0,0), W2 with GN(1,1), W3 with GN(1,1), and W4 with GN(1,2). However, two wells (W2, W3) are associated with GN(1,1), so the grid spacing is reduced, e.g., halved as shown in FIG. 14. In this spacing, the wells are again associated with the closest node, i.e. W1 with GN(0,0), W2 with GN(3,1), W3 with GN(2,2), and W4 with GN(2,4). This grid spacing is suitable because no more than one well is associated with any single node.

As an example of populating non-well nodes, a process according to two different embodiments of the invention is applied to GN(1,1), which is between GN(0,1) and GN(2,1) to which are assigned wells W1 and W2, respectively, as shown in FIG. 15. The generalized well logs for wells W1 and W2, respectively, shown in FIGS. 16 and 17, have stratigraphic correlations A and B with the relationship between depth, Y, and a generalized logging variable X, as follows: over the intervals Y=0→A, X=2; over the intervals Y=A→B, X=1; and over the intervals Y=B→1000, X=3.

In one embodiment where stratigraphic correlations A and B are not used, a mathematical average of the well logging variable for the nearby wells is applied as shown in FIG. 18. In this instance the generalized well log for node GN(1,1) is as follows: over the interval Y=0→A1, X=2; over the interval Y=A1→A2, X=1.5; over the interval Y=A2→B1, X=2; over the interval Y=B1→B2, X=2; and over the interval Y=B2→1000, X=3; where A1 and B1 represent the depth of the stratigraphic correlations at well W1, and A2 and B2 at well W2. This approach tends to blur the well log data for the non-well node being populated across the stratigraphic correlations, but is still useful in one embodiment.

The use of stratigraphic correlations for the same node is illustrated in FIG. 19. In this instance, the height of the correlations A and B at GN(1,1) is taken as a weighted average of the heights of the same correlations at the nearby wells W1 and W2, e.g., A(1,1)=(A1+A2)/2 and B(1,1)=(B1+B2)/2. This provides a more realistic population of the well log data at the non-well nodes, and a more crisp visualization of the data at the stratigraphic correlations that can be expected.

Figure 20:
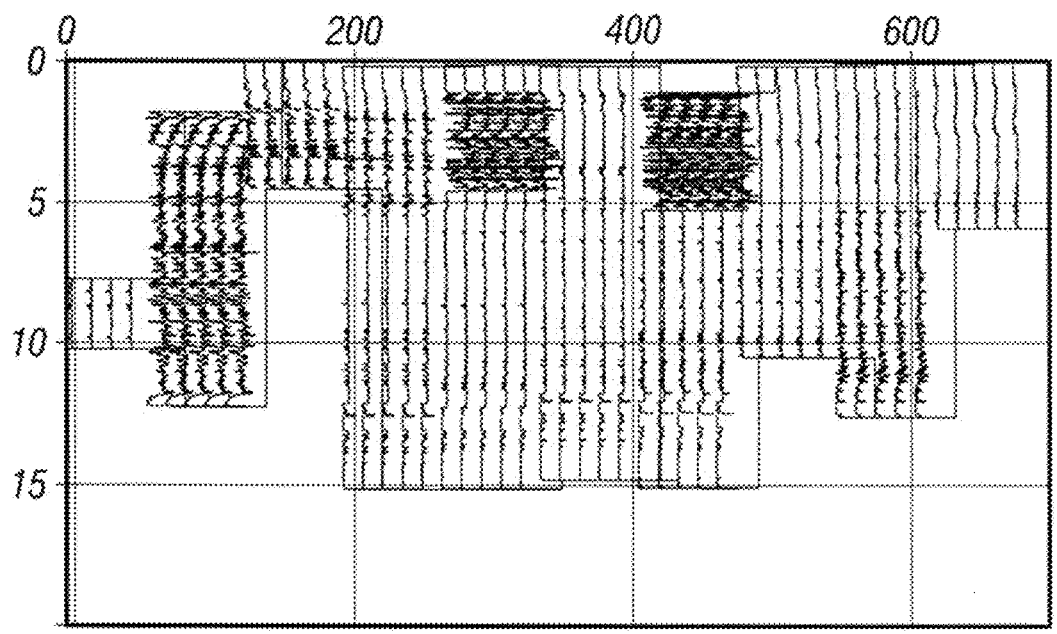
FIG. 20 shows a wiggle trace display of ten well log gamma-ray curves converted into SEG-Y format according to the process shown in FIG. 8.
Figure 21:
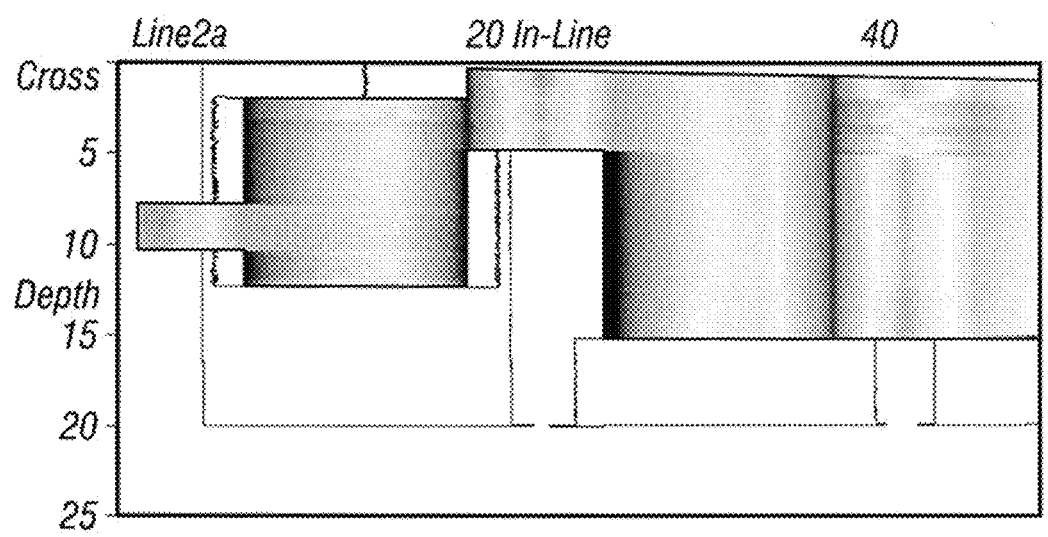
FIG. 21 shows the data shown in FIG. 20 in a commercially available 3D seismic evaluation application.

As is illustrated in FIG. 20, well log data, in this case ten well log gamma-ray curves have been converted into SEG-Y format according to an embodiment of the instant disclosure. The data are shown in a "wiggle trace" display as are readily known to one of minimal skill in the art. FIG. 21 shows the data presented in FIG. 20, presented in a 3D seismic application (OpendTect V.4.0), which is commercially available and readily known to one of skill in the art.

As FIGS. 20 and 21 demonstrate, the data produced according to the processes disclosed herein may be interpreted, processed, and manipulated just like seismic data generated from traditional sources.

In embodiments, a non-vertical wellbore path may populate one or more than one node for any given depth increment associated with the 3D well log grid, as demonstrated in FIGS. 22 and 23. As shown in FIG. 22, well log values are assigned to grid nodes of a 3D well log grid for both vertical wellbore W1 and non-vertical wellbore W2. In the case of wellbores W1 and W2 the "true vertical depth", also known as TVD in the industry, is the depth from the surface directly above the point in the wellbore in question, which is generally located at the wellhead in the case of vertical wellbore W1, and may be spaced away from the respective wellhead in the case of non-vertical wellbore W2. The TVD at each measured depth point along the wellbore path of wellbore W2 is always greater than the preceding point, therefore in this illustrated example only one node for each depth increment from the surface is populated by each wellbore W1, W2.

In FIG. 22, the nodes in a particular depth increment or z value may be populated with measured depth points at or intersecting with the particular depth increment or z value, e.g., at measured depths z0, z1 and z2, the corresponding measured depth points from wellbore W1 at those depths are closest to and thus assigned to the same x, y, z nodes: GN(x0, y0, z0), GN(x0, y0, z1), GN(x0, y0, z2); whereas in the case of the deviated wellbore W2, the lower measured depth points at z0, z1 and z2 are offset from the respective surface x, y grid nodes and are assigned as follows: GN(x0, y0, z0), GN(x1, y1, z1), GN(x2, y2, z2). Moreover, the wellbore W2 location at the measured depths corresponding to z1 and z2 that are closest to the subsurface grid nodes, i.e. GN(x1, y1, z1), GN(x2, y2, z2), lie in the z1 and z2 planes, respectively, although the grid node assignment may be made in this manner regardless of whether or not there is a closer datapoint for W2 either above or below the respective plane.

The grid spacing in FIG. 22 is sufficiently narrow that the x, y, z datapoints from no more than one well are assigned to any one single-well x, y grid node, which are subsequently utilized in populating the respective single-well x, y and/or x, y, z grid nodes with the attributes associated with the assigned x, y, z datapoints to form a matrix of x, y, z grid nodes populated with the attributes to generate the 3D well log grid according to embodiments of the present invention.

FIG. 23 shows a representative example of a non-vertical wellbore W3 where TVD values of some wellbore path intervals are less than or equal to the preceding points resulting in the wellbore path intersecting the same depth increment of a 3D well log grid multiple times, e.g., at depth z1, the following grid nodes may be populated: GN(x1, y1, z1), GN(x2, y2, z1), GN(x3, y3, z1).

FIG. 23 also shows the case where grid nodes are populated for a given depth increment surface by using closest points for which data is available which are not at the TVD of the grid node to which they are assigned, but are closer to the x, y coordinates of the grid node at an adjacent position above or below the depth increment in question, e.g., a non-intersecting wellbore path adjacent the grid node above the depth increment, or an intersecting wellbore path that travels closer to the respective grid node below the depth increment. Grid nodes for a given depth increment may be populated by a wellbore path or point not intersecting with the particular depth increment plane, e.g., if the wellbore path passes within a pre-determined distance of the depth increment grid node. This pre-determined distance may be set by the operator, and in one embodiment is less than 50% of the grid increment setting of the 3D well log grid. In an embodiment, the well log data from the single wellbore sample point closest to the grid node at a depth increment and within the pre-determined distance is used to populate the 3D well log grid. For purposes of populating the 3D well log grid in one embodiment, the geometric distance between the sample depth points in a non-vertical wellbore path and the nearby grid nodes are calculated, e.g., in a particular embodiment from the depth increment planes or surfaces directly above and/or below the wellbore path. The geometric distance in one embodiment, e.g., to determine which datapoint of the available well data is closest to a particular grid node, can be calculated utilizing a simple or weighted version the distance formula:

$$d(P1,P2) = \sqrt{(x2-x1)^2 + (y2-y1)^2 + (z2-z1)^2}.$$

All documents described herein are incorporated by reference herein, including any patent applications and/or testing procedures to the extent that they are not inconsistent with this application and claims. The principles, preferred embodiments, and modes of operation of the present invention have been described in the foregoing specification. Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

I claim:

1. A process to generate and display a 3D well log grid comprising the steps of:
    a. selecting an initial x, y grid spacing,
    b. assigning x, y, z datapoints, from wells from a dataset of well data comprising attributes associated with the x, y, z datapoints, to closest x, y nodes in the grid, wherein the x, y, z datapoints from a plurality of the wells are spaced away from the closest x, y grid nodes,
    c. if x, y, z datapoints from a plurality of wells are assigned to a single x, y grid node after completing step b, narrowing the x, y grid spacing and repeating step b until the x, y, z datapoints from no more than one well are assigned to any one single-well x, y grid node,
    d. populating the respective single-well x, y grid nodes with the attributes associated with the assigned x, y, z datapoints to form a matrix of x, y, z grid nodes populated with the attributes to generate a 3D well log grid, and
    e. generating a display from the 3D well log grid.

2. The process of claim 1, wherein the well data comprise the attributes from one or more non-vertical wellbores associated with an ordered collection of values of the x, y, z datapoints defining a wellbore path of the one or more non-vertical wellbores.

3. The process of claim 2, further comprising processing wellbore directional surveys for the one or more non-vertical wellbores to associate a measured wellbore depth with the x, y, z datapoint values defining the wellbore path.

4. The process of claim 2, wherein the attributes comprise tabulated well log data, whereby the 3D well log grid comprises a matrix of x, y, z grid nodes populated with tabulated well log data assigned to the single-well x, y grid nodes.

5. The process of claim 2, wherein the attributes comprise stratigraphic correlations, whereby the 3D well log grid comprises a matrix of x, y, z grid nodes populated with stratigraphic correlations assigned to the single-well x, y grid nodes.

6. The process of claim 2, further comprising populating non-datapoint nodes with well log data extrapolated from single-well nodes to form an all-node-populated 3D matrix of well log data.

7. The process of claim 6, further comprising converting the all-node-populated 3D matrix of well log data to a seismic data format.

8. The process of claim 1, wherein the assignment of x, y, z datapoints from wells to closest x, y nodes in the grid in step b, where a plurality of x, y, z datapoints from the same well are closest to the same x, y node relative to x, y, z datapoints from other wells, comprises assigning a closest one of the plurality of the x, y, z datapoints from the same well to the x, y node.

9. The process of claim 8, wherein the remaining one(s) of the plurality of x, y, z datapoints, from the same well closest to the same x, y node not assigned to the closest x, y node in step b, are taken into account to populate the remaining x, y nodes.

10. The process of claim 1, further comprising calculating a path of one or more non-vertical wellbores in the dataset for which a directional survey is available, and using the calculated path to determine the closest x, y node to the x, y, z datapoints for the one or more non-vertical wellbores for which a directional survey is available in step b.

11. The process of claim 10, wherein the dataset comprises one or more non-vertical wellbores for which no directional survey is available, and further comprising, with respect to the one or more non-vertical wellbores for which no wellbore directional survey is available, excluding from step b the x, y, z datapoints for the one or more non-vertical wellbores for which no directional survey is available.

12. The process of claim 10, wherein the dataset comprises one or more non-vertical wellbores for which no directional survey is available, and further comprising, with respect to the one or more non-vertical wellbores for which no wellbore directional survey is available, considering in step b the x, y, z datapoints for the one or more non-vertical wellbores for which no directional survey is available, as x, y, z datapoints from a vertical wellbore.

13. A process to display a 3D matrix of well log data, comprising the steps of:
associating tabulated well data, comprising well log data from a plurality of wells, comprising at least one non-vertical wellbore, associated with unique well identifiers and stratigraphic correlations by well, with a matrix of x, y grid nodes wherein x, y, z datapoints from no more than one well are assigned to single x, y grid nodes to generate a 3D grid matrix of well log data, wherein the matrix comprises a uniform spacing between the x, y grid nodes with respect to an X-axis and a uniform spacing between the x, y grid nodes with respect to a Y-axis, wherein the spacing with respect to the X- and Y-axes may be the same or different; and
generating the uniform grid spacings with respect to the X- and Y-axes by the steps of:
a. selecting an initial 2D grid spacing;
b. assigning x, y, z datapoints from the tabulated well data to closest x, y grid nodes;
c. if x, y, z datapoints from a plurality of wells are assigned to a single x, y grid node after completing step b, narrowing the grid spacing and repeating step b until x, y, z datapoints from no more than one well are assigned to any x, y grid node; and
generating a display from the 3D grid matrix of well log data.

14. The process of claim 13, wherein the assignment of x, y, z datapoints from the one or more non-vertical wellbores to the closest x, y grid nodes in step b, where a plurality of x, y, z datapoints from the same well are closest to the same x, y grid node at a common z increment, comprises assigning a closest one of the plurality of the x, y, z datapoints from the same well to the x, y node at the common z increment.

15. The process of claim 14, wherein the remaining one(s) of the plurality of x, y, z datapoints, from the same well closest to the common z increment at the same x, y grid node not assigned to the closest x, y node at the common z increment in step b, are taken into account in extrapolating data to populate the remaining x, y grid nodes.

16. The process of claim 13, wherein the at least one non-vertical wellbore comprises one or more non-vertical wellbores for which a directional survey is available, further comprising:
calculating a path of the one or more non-vertical wellbores for which the directional survey is available; and
using the calculated path to determine the closest x, y grid node to the x, y, z datapoints for the one or more non-vertical wellbores for which the directional survey is available in step b.

17. The process of claim 16, wherein the at least one non-vertical wellbore comprises one or more non-vertical wellbores for which no directional survey is available, and further comprising with respect to the one or more non-vertical wellbores for which no wellbore directional survey is available, excluding from step b the x, y, z datapoints for the non-vertical wellbores for which no directional survey is available.

18. The process of claim 16, wherein the at least one non-vertical wellbore comprises one or more non-vertical wellbores for which no directional survey is available, and further comprising, with respect to the one or more non-vertical wellbores for which no wellbore directional survey is available, considering in step b the x, y, z datapoints for the one or more non-vertical wellbores for which no directional survey is available, as x, y, z datapoints from a vertical wellbore.

19. A process to display a 3D matrix of well data, comprising the steps of:
a. selecting an initial 3D grid spacing comprising x, y, z nodes having a uniform grid spacing with respect to an X-axis and with respect to a Y-axis, wherein the grid spacing with respect to the X- and Y-axes may be the same or different;
b. assigning x, y, z datapoints from wells from a dataset of well data comprising attributes associated with the x, y, z datapoints, to closest x, y, z nodes in the grid, wherein the wells comprise one or more non-vertical wellbores, and wherein the x, y, z datapoints from a plurality of the wells are spaced away from closest x, y grid nodes;
c. if x, y, z datapoints from a plurality of wells are assigned to a single x, y, z node after completing step b, narrowing the grid spacing and repeating step b until x, y, z datapoints from no more than one well are assigned to any one x, y, z node, wherein a plurality of the assigned x, y, z datapoints are spaced away from the respective closest x, y, z nodes;
d. populating the closest x, y, z nodes with the attributes associated with the assigned x, y, z datapoints to form a matrix of x, y, z grid nodes populated with the attributes to generate a 3D well log grid;
e. if any x, y, z nodes remain unpopulated after step d, populating the remaining x, y, z nodes with well data extrapolated from the populated closest x, y, z nodes to generate an all-node-populated 3D matrix of well data;

f. converting the all-node-populated 3D matrix of well data to a format of seismic data; and g. generating a display from the seismic data formatted 3D matrix.

20. The process of claim 19, wherein the well data comprise well log data and the display comprises a wiggle trace display.

21. The process of claim 19, wherein the well log data comprise stratigraphic correlations by wellbore, whereby the x, y, z datapoints assigned to the x, y, z nodes in step b comprise the stratigraphic correlations.

22. The process of claim 19, wherein the assignment of x, y, z datapoints from non-vertical wellbores from a dataset of well data to closest x, y, z nodes in the grid in step b, where a plurality of x, y, z datapoints from the same well are closest to the same x, y, z node, comprises assigning a closest one of the plurality of the x, y, z datapoints from the same well to the x, y, z node.

23. The process of claim 22, wherein the remaining one(s) of the plurality of x, y, z datapoints, from the same well closest to the same x, y, z node not assigned to the closest x, y, z node in step b, are taken into account in the extrapolated data to populate the remaining x, y, z nodes in step e.

24. The process of claim 19, wherein the wells comprise one or more non-vertical wellbores for which a directional survey is available, and further comprising:

calculating a path of the one or more non-vertical wellbores for which the directional survey is available, and using the calculated path to determine the closest x, y, z node to the x, y, z datapoints in step b for the one or more non-vertical wellbores for which the directional survey is available.

25. The process of claim 24, wherein the wells further comprise one or more non-vertical wellbores for which no directional survey is available, and further comprising, with respect to the one or more non-vertical wellbores for which no wellbore directional survey is available, excluding from step d the x, y, z datapoints for the one or more non-vertical wellbores for which no directional survey is available.

26. The process of claim 24, wherein the wells further comprise one or more non-vertical wellbores for which no directional survey is available, and further comprising, with respect to the non-vertical wellbores for which no wellbore directional survey is available, considering in step d the x, y, z datapoints for the one or more non-vertical wellbores for which no directional survey is available, as x, y, z datapoints from a vertical wellbore.

* * * * *